United States Patent
Baldwin et al.

(10) Patent No.: US 7,319,857 B2
(45) Date of Patent: Jan. 15, 2008

(54) METHODS, SYSTEMS, AND COMPUTER PROGRAM PRODUCTS FOR DELIVERING MESSAGING SERVICE MESSAGES

(75) Inventors: Patricia A. Baldwin, Raleigh, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 0 days.

(21) Appl. No.: 11/122,987

(22) Filed: May 5, 2005

(65) Prior Publication Data

US 2006/0068762 A1 Mar. 30, 2006

Related U.S. Application Data

(60) Provisional application No. 60/609,486, filed on Sep. 13, 2004.

(51) Int. Cl.
*H04L 12/58* (2006.01)
(52) U.S. Cl. ............... 455/412.1; 455/433; 455/561.1
(58) Field of Classification Search ............ 455/412.1, 455/412.2, 418, 419, 561.1, 561.2
See application file for complete search history.

(56) References Cited

U.S. PATENT DOCUMENTS

| | | | |
|---|---|---|---|
| 5,579,371 A | 11/1996 | Aridas et al. | |
| 5,724,658 A | 3/1998 | Hasan | |
| 5,905,952 A | 5/1999 | Joensuu et al. | |
| 5,915,222 A | 6/1999 | Olsson et al. | |
| 6,006,098 A | 12/1999 | Rathnasabapathy et al. | |
| 6,047,327 A | 4/2000 | Tso et al. | |
| 6,052,591 A | 4/2000 | Bhatia | |
| 6,091,958 A | 7/2000 | Bergkvist et al. | |
| 6,091,959 A | 7/2000 | Souissi et al. | |
| 6,097,960 A | 8/2000 | Rathnasabapathy et al. | |
| 6,119,014 A | 9/2000 | Alperovich et al. | |
| 6,122,510 A | 9/2000 | Granberg | |
| H1895 H | 10/2000 | Hoffpauir et al. | |
| 6,134,438 A | 10/2000 | Sawyer | |
| 6,144,663 A | 11/2000 | Hallenstal | |
| 6,151,505 A | 11/2000 | Larkins et al. | |
| 6,175,743 B1 | 1/2001 | Alperovich et al. | |
| 6,219,551 B1 | 4/2001 | Hentilä | |
| 6,324,399 B1 | 11/2001 | Salmivalli | |
| 6,381,456 B1 | 4/2002 | Ko | |

(Continued)

FOREIGN PATENT DOCUMENTS

DE 198 05 261 8/1999

(Continued)

OTHER PUBLICATIONS

3GPP, "Universal Mobile Telecommunications System (UMTS); Super-Charger Technical Realization; Stage 2," ETSI, p. 1-28, (2001).

(Continued)

*Primary Examiner*—CongVan Tran
(74) *Attorney, Agent, or Firm*—Jenkins, Wilson, Taylor & Hunt, P.A.

(57) ABSTRACT

A messaging service subscriber caching (MSSC) function caches mobile subscriber location information obtained from intercepted mobility management signaling messages. The MSSC function intercepts messaging service messages that are destined for a messaging service center and performs a first delivery attempt using the cached subscriber location information.

37 Claims, 13 Drawing Sheets

U.S. PATENT DOCUMENTS

| | | | |
|---|---|---|---|
| 6,381,465 | B1 | 4/2002 | Chern et al. |
| 6,400,943 | B1 | 6/2002 | Montoya |
| 6,505,046 | B1 | 1/2003 | Baker |
| 6,505,050 | B1 | 1/2003 | Brudos et al. |
| 6,567,658 | B1 | 5/2003 | Van De Graaf |
| 6,578,085 | B1 | 6/2003 | Khalil et al. |
| 6,611,687 | B1 | 8/2003 | Clark et al. |
| 6,622,016 | B1 | 9/2003 | Sladek et al. |
| 6,650,902 | B1 | 11/2003 | Richton |
| 6,662,017 | B2 | 12/2003 | McCann et al. |
| 6,735,441 | B1 | 5/2004 | Turgeon et al. |
| 6,738,362 | B1 | 5/2004 | Xu et al. |
| 6,901,262 | B2 * | 5/2005 | Allison et al. ............ 455/456.1 |
| 6,920,318 | B2 * | 7/2005 | Brooking et al. ........... 455/419 |
| 2001/0046856 | A1 | 11/2001 | McCann |
| 2002/0026527 | A1 | 2/2002 | Das et al. |
| 2002/0037750 | A1 | 3/2002 | Hussain et al. |
| 2002/0050927 | A1 | 5/2002 | De Moerloose et al. |
| 2002/0065086 | A1 | 5/2002 | Vanttinen et al. |
| 2003/0129991 | A1 | 7/2003 | Allison et al. |
| 2005/0043036 | A1 | 2/2005 | Ioppe et al. |

FOREIGN PATENT DOCUMENTS

| | | |
|---|---|---|
| EP | 0 710 043 | 5/1996 |
| EP | 1 397 013 | 3/2004 |
| WO | WO 99/40748 | 2/1999 |
| WO | WO 03/051075 | 6/2003 |

OTHER PUBLICATIONS

3GPP, "3rd Generation Partnership Project; Technical Specification Group Core Network; Gateway Location Register (GLR)—Stage 2," ETSI, p. 1-129, (1999).

"Cisco IP Transfer Point as the Signaling Gateway for the Cisco BTS 10200 Softswitch," Cisco Systems, Inc., pp. 1-10 (Summer 2004).

"Cisco IP Transfer Point as the Signaling Gateway for the Cisco PGW 2200 Softswitch," Cisco Systems, Inc., pp. 1-11 (Summer 2004).

"Next-Generation Signaling Transports Cisco IP Transfer Point," Cisco Systems, Inc., pp. 1-27 (Summer 2004).

"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).

Walker, "The IP Revolution in Mobile Messaging," PACKET, Cisco Systems Users Magazine, vol. 16, No. 1, pp. Cover; 73-74; and 89 (First Quarter 2004).

"Cisco ITP Multilayer Routing (MLR) SMS MO Routing Requirements," Cisco Systems, Inc., p. 1 (Copyright 2004).

"Cisco Signaling Gateway Manager Release 3.2 For Cisco IP Transfer Point," Cisco Systems, Inc., pp. 1-9 (Copyright 1992-2004).

"Solutions for Mobile Network Operators," Cisco Systems, Inc., pp. 1-8 (Copyright 1992-2004).

Moodie, "Agilent acceSS7: White Paper," Agilent Technologies, pp. 1-14 (Apr. 1, 2003).

"Cisco IP Transfer Point," Cisco Systems, Inc., pp. 1-10 (Copyright 1992-2003).

"Cisco IP Transfer Point Multilayer Short Message Service Routing Solution," Cisco Systems, Inc., pp. 1-6 (Copyright 1992-2003).

"Cisco ITP MAP Gateway for Public WLAN SIM Authentication and Authorization," Cisco Systems, Inc., pp. 1-13 (Copyright 1992-2003).

Barry, "A Signal for Savings," PACKET, Cisco Systems Users Magazine, vol. 14, No. 4, pp. Cover; 19-21; and 81 (Fourth Quarter 2002).

"Agilent Technologies and Cisco Systems SS7 over IP White Paper," Cisco Systems, Inc. and Agilent Technologies, pp. 1-6 (Copyright 2002—Printed in the UK Feb. 1, 2002).

"Cisco IP Transfer Point: MTP3 User Adaptation (M3UA) and SCCP User Adaptation (SUA) Signaling Gateway," Cisco Systems, Inc., pp. 1-14 (Copyright 2002).

"Cisco SS7 Port Adapter for the Cisco 7500 Versatile Interface Processor and 7200 VXR Routers Provide High-Density SS7 Aggregation," Cisco Systems, Inc., pp. 1-5 (Copyright 1992-2002).

"Next-Generation SS7 Networks with the Cisco IP Transfer Point," Cisco Systems, Inc., pp. 1-14 (Copyright 1992-2002).

"Agilent acceSS7 Business Intelligence," Agilent Technologies, pp. 1-6 (Copyright 2001—Printed in the UK Nov. 30, 2001).

"Cisco IP Transfer Point (ITP) Network Management Product Presentation," Cisco Systems, Inc., pp. 1-20 (Copyright 2001).

"Networkers," Cisco Systems, Inc., pp. 1-60 (Copyright 2001).

"Cisco SS7 Signaling Offload," Cisco Systems, Inc., pp. 1-33 (Copyright 1992-2001).

"Digital Cellular Telecommunications System (Phase 2+); Technical Realization of the Short Message Service (SMS); (GSM 03.40 version 7.4.0 Release 1998)." ETSI TS 100 901, V7.4.0, pp. 1-121 (Dec. 1999).

"Topsail Beach—SS7 Over IP—"Cisco Systems, Inc., pp. 1-16 (Copyright 1999).

Urs, "Roaming Notification and Local Service Control Through Short Message Service," Motorola, XP-000781004, pp. 17-19 (Mar. 1998).

"Digital Cellular Telecommunications System (Phase 2+); Mobile Application Part (MAP) Specification GSM 09.02)," ETSI, ETS 300 974, pp. 1-752 (May 1997).

"Eagle Feature Guide," Tekelec, P/N 910-1225-01, Revision A, pp. i-iv and 1-143 (Mar. 1996).

Chatras et al., "Mobile Application Part Design Principles," International Switching Symposium, Proceedings vol. 1, pp. 35-42 (1990).

"Chapter 1: Overview," SS7 Port Adapter Installation and Configuration, pp. 1-1-1-8 (Publication Date Unknown).

"Configuring ITP Basic Functionality," IP Transfer Point, Cisco IOS Release 12.2(4)MB12, pp. 31-50 (Publication Date Unknown).

"Configuring ITP Optional Features," IP Transfer Point, Cisco IOS Release 12.2(4)MB12, pp. 65-136 (Publication Date Unknown).

"Configuring M3UA and SUA SS7 Over IP Signaling Gateways," IP Transfer Point, Cisco IOS Release 12.2(4)MB13, pp. 51-66 (Publication Date Unknown).

"Configuring M3UA and SUA SS7 Over IP Signaling Gateways," IP Transfer Point, Cisco IOS Release 12.2(4)MB10, pp. 49-62 (Publication Date Unknown).

"Introduction to GSM," Performance Technologies, http://www.pt.com/products/gsmintro.html, pp. 1-8 (Publication Date Unknown).

3GPP, "Universal Mobile Telecommunications System (UMTS); Super-Charger Technical Realization; Stage 2," ETSI, p. 1-28 (2001).

Commonly-assigned, co-pending U.S. Appl. No. 09/649,461 for "Methods and Systems for Generating and Sending Messages in a Mobile Communications Network in Response to a Change in Location of a Subscriber," (Unpublished, filed Aug. 25, 2000).

3GPP, "3rd Generation Partnership Project; Technical Specification Group Core Network; Gateway Location Register (GLR)—Stage 2," ETSI, p. 1-129 (1999).

* cited by examiner

METHODS, SYSTEMS, AND COMPUTER PROGRAM PRODUCTS FOR DELIVERING MESSAGING SERVICE MESSAGES

RELATED APPLICATIONS

This application claims the benefit of U.S. Provisional Patent Application Ser. No. 60/609,486, filed Sep. 13, 2004, the disclosure of which is incorporated herein by reference in its entirety.

TECHNICAL FIELD

The subject matter disclosed herein relates to methods and systems for delivering messaging service messages, such as short message service (SMS) and multimedia message service (MMS) messages in a communications network. More particularly, the subject matter disclosed herein relates to techniques for delivering a messaging service message to a recipient without querying the recipient's home network.

BACKGROUND ART

Short message service (SMS), which was first introduced by European wireless network operators in 1991, enables mobile subscribers to easily send and receive text messages via wireless handsets. Although specifications and industry standards related to SMS are constantly evolving and being modified, SMS messages have traditionally been used to convey readable text information, where the text can include any combination of characters that can be entered via a keypad or keyboard. Multimedia message service (MMS) extends the basic SMS concept to include a variety of message content types, including text, still images, video, and audio.

SMS delivery service provides a mechanism for transmitting messages to and from SMS capable terminals (e.g., wireless handsets, personal computers, etc.) via the signaling component of the wireless communication network. With particular regard to the sending and receiving of SMS messages by a wireless handset, a signaling network provides the transport facilities necessary to communicate short messages between a store-and-forward network element, known as a short message service center (SMSC), and a wireless handset. In contrast to earlier text message transmission services, such as alphanumeric paging, SMS technology is designed to provide guaranteed delivery of an SMS message to a destination. That is, if a temporary network failure, or the unavailability of a message recipient prohibits the immediate delivery of an SMS message, then the SMS message is stored in the network (i.e., at an SMSC) until the destination/intended message recipient becomes available. Another of the key and distinguishing characteristics of SMS service, with respect to previously available message communication services, is that an active mobile handset is able to send or receive a short message at any time, regardless of whether or not a voice or data call is in progress.

Other types of messaging services provided in a communications network may include those generically referred to as instant message (IM) messaging services. Instant messages are typically communicated between end users in real or near-real time without the use of intermediate store-and-forward processors. As such, IM services typically do not permit a message to be sent until the recipient is available.

FIG. 1 is a network diagram illustrating an SMS implementation in a global system for mobile communication (GSM) network. It will be appreciated that a functionally similar SMS architecture could also be employed in non-GSM networks, such as a session initiation protocol (SIP)-based network, or an IP multimedia subsystem (IMS) network. FIG. 1 includes a wireless communication network, generally indicated by reference numeral 100. Wireless network 100 includes a sending mobile station 102 that sends and receives SMS messages and a base station subsystem 104 that manages the network-to-air interface and reliably transmits SMS messages and from into the signaling portion of the network. In this particular example, the receiving end of the network includes a base station subsystem 106 and a receiving mobile station 108, both of which are functionally similar to devices 102 and 104 described above. Also included in wireless network 100 are mobile switching center/visitor location register (MSC/VLR) nodes 110 and 112, signal transfer points (STPs) 114 and 116, an SMSC 118, and a home location register (HLR) 120.

As described above, SMSC 118 is responsible for the relaying and store-and-forwarding of a short message between sending and receiving SMS terminals. HLR 120 is a database platform used for storage and management of mobile service subscriptions, mobile subscriber profiles, and locations. HLR databases store information about subscribers that belong to the same network as the HLR. In IP multimedia subsystem (IMS) networks, a network entity known as a home subscriber server (HSS) provides functionality and services similar to that of an HLR. That is, an HSS stores subscriber subscription, profile, and location information for subscribers of the same network as the HSS.

A database element, known as visitor location register (VLR) is used to temporarily store information about subscribers who are currently roaming in the area serviced by that VLR. The VLR may belong to the subscriber's home network or to a non-home network. Typically, VLR databases are co-located with MSC network elements, and as such a stand-alone VLR node is not shown in FIG. 1. The HLR and VLR store information needed to correctly route voice calls or data communications to the mobile subscriber. This information may include international mobile station identification (IMSI), mobile identification number (MIN), mobile directory number (MDN), and mobile station international ISDN number (MSISDN), as well as the IDs of the VLR and MSC with which the subscriber is currently associated.

With particular regard to short message service operations, HLR 120 may provide SMSC 118 with routing information for the receiving mobile station 108. In certain cases, HLR 120 may also inform SMSC 118, which has previously initiated unsuccessful short message delivery attempts to a specific mobile station, that the mobile station is now accessible.

It will be appreciated that MSC 110 is sometimes referred to as an SMS interworking MSC (SMS-IWMSC) because it is capable of receiving a short message from a wireless network and submitting it to the appropriate SMSC node. In a similar manner, MSC 112 is sometimes referred to as an SMS gateway MSC (SMS-GMSC) because it is capable of receiving a short message from an SMSC, interrogating an HLR for routing information, and subsequently delivering the short message to the visited or serving MSC of the recipient mobile station. In practice, SMS-GMSC/SMS-IWMSC nodes are typically integrated with the SMSC.

The signaling infrastructure of wireless network 100 is based on signaling system no. 7 (SS7), a telecommunications industry standard signaling protocol. A detailed discussion of SS7 signaling message types and their associated function can be found in Signaling System #7 by Travis Russell, McGraw-Hill Publishing 1998. Additionally, a detailed discussion of SS7 related signaling within a GSM network can be found in The GSM System for Mobile Communications by Michel Mouly and Marie-Bernadette Pautet, Cell & Sys 1992.

SMS service makes use of the SS7 mobile application part (MAP), which defines the methods and mechanisms for mobility management signaling communications in a wireless network. The American MAP standard is published by Telecommunication Industry Association and is referred to as IS-41 MAP, while the international standard is defined by the European Telecommunication Standards Institute and is referred to as GSM MAP. Depending upon the particular implementation, SMS service may also utilize the signaling connection control part (SCCP) and transaction capabilities application part (TCAP) components of the SS7 protocol. Within the context of SS7 signaling over Internet protocol (IP), an IP adaptation protocol such as the SCCP user adaptation (SUA) layer defined by the Internet Engineering Task Force (IETF) may also be utilized to facilitate SMS and MMS service. Other signaling protocols, such as session initiation protocol (SIP) may also be used to transport messaging service messages (e.g., SMS, MMS, IM) through a communications network.

FIG. 2 is an exemplary mobility management signaling message flow diagram associated with a typical location update operation triggered by roaming MS 108 shown in FIG. 1. When MS 108 roams into the coverage area served by MSC 112, MS 108 registers with MSC/VLR 112 (line 1), which triggers a location update transaction. The VLR component of MSC/VLR 112 generates an SS7 MAP UpdateLocation signaling message, which is routed to the mobile subscriber's HLR 120 (line 2). The UpdateLocation message includes information identifying the new serving MSC and VLR (MSC/VLR 112). The mobile subscriber's HLR 120 receives and processes the UpdateLocation message and, in response, sends the serving MSC/VLR information related to the roaming MS 108 (line 3). This mobile subscriber information is conveyed to MSC/VLR 112 in a MAP InsertSubscriberData signaling message. MSC/VLR 112 receives and processes the InsertSubscriberData message and responds to HLR 120 with an InsertSubscriberData_Ack message (line 4). The location updating transaction is concluded when HLR 120 sends an UpdateLocation_Ack message to MSC/VLR 124 (line 5). Once this mobility management procedure is completed, serving MSC/VLR 112 has obtained the information necessary to provide MS 108 with the network services which have been authorized, and HLR 120 has obtained the location information necessary to route calls or messaging service messages to the recipient MS.

FIG. 3 is an exemplary information flow diagram associated with the delivery of an SMS message to a MS 108 in a GSM network. Referring to FIG. 3, in line 1, a short message, such as a text message, is formulated by sending mobile station 102 and is subsequently transmitted to the mobile originated (MO) MSC/VLR 110, which is serving mobile station 108. In line 2, the short message content is communicated via a GSM ForwardShortMessage message to SMSC node 118. In response to receiving the ForwardShortMessage, SMSC 118 formulates an SMS send routing information (SRI) query message and transmits the SRI message to HLR 120 associated with the message recipient (line 3). HLR 120 responds to the SRI query and provides SMSC 118 with the network routing information required to deliver the short message to the mobile terminated (MT) MSC/VLR entity that is currently serving receiving MS 108. Upon receiving the network routing information, SMSC 118 transmits the short message to MT MSC/VLR node 112 (assuming the recipient MS is available), as indicated in line 4. Using the information obtained from the MT MSC/VLR database, paging and authentication operations are initiated, and MT MSC/VLR 112 transmits the SMS message to the receiving mobile subscriber, as indicated in line 5. Additional SMS delivery report and acknowledgment messages, not shown in this example, may also be generated within network 100 during an SMS message delivery transaction.

Based on the SMS delivery example described above, conventional methods for delivery of SMS messages require an HLR query for each SMS message to be delivered. One problem with requiring an HLR query for each SMS message is that the time for delivering each SMS message is increased. Another problem associated with requiring an HLR query for each SMS message is that signaling message traffic and HLR utilization are also increased. Accordingly, there exists a need for methods, systems, and computer program products for reducing or minimizing the volume of subscriber location register (e.g., HLR, HSS) query traffic associated with the delivery of messaging service messages, such as IM, SMS messages and MMS messages.

DISCLOSURE

According to one aspect, the subject matter disclosed herein includes a messaging service subscriber cache (MSSC) function that is adapted to temporarily cache mobile subscriber mobility management information obtained from intercepted SS7 MAP signaling messages. The MSSC function is further adapted to intercept an SMS message that is destined for a short message service center (SMSC) and attempt to deliver the SMS message using the cached mobility management information. If the first delivery attempt fails or if the MSSC cache does not contain location information for the intended mobile subscriber, then the SMS message is forwarded to the SMSC where conventional store-and-forward delivery processing may be performed. As such, an HLR query may be avoided if the first delivery attempt using the cached subscriber data is successful. Also, by intercepting and delivering at least a portion of the SMS message traffic, the MSSC function effectively lessens the processing demand on the store-and-forward SMSC.

According to another aspect of the subject matter disclosed herein, a network routing node, such as a signal transfer point (STP) or SS7/IP signaling gateway (SG), is adapted to temporarily cache mobile subscriber mobility management information obtained from intercepted SS7 MAP signaling messages. A cache-equipped SG is adapted to intercept an HLR query message that is sent by an SMSC and respond to the query on behalf of the HLR using mobility management information contained in the local cache.

According to another aspect of the subject matter disclosed herein, a MSSC function that is adapted to temporarily cache mobile subscriber mobility management information obtained from intercepted session initiation protocol (SIP) signaling messages. The MSSC function is further adapted to intercept a messaging service message (e.g., an IM message, an SMS message, or an MMS message), which may be contained within a SIP message, where the message is destined for a message service server in an IP network, such as an IMS network. The MSSC function is adapted to attempt delivery of the intercepted SIP message using the cached mobility management information. If the first delivery attempt fails or if the MSSC cache does not contain location information for the intended mobile subscriber, then the SIP message is forwarded to the message server, where an HSS query operation and/or store-and-forward delivery processing may be performed. As such, an IMS HSS query may be avoided if the first delivery attempt using the cached subscriber data is successful. Also, by intercepting and delivering at least a portion of the IMS messaging service traffic, the MSSC function effectively lessens the processing demand on message server resources in the network.

According to one aspect of the subject matter described herein, a method for messaging service message delivery is provided. The method includes, at a subscriber location database separate from a network location register, caching mobile subscriber location information based on messages sent to or from the location register. Further, at a messaging service subscriber caching function, a messaging service message is received, the subscriber location database is queried, mobile subscriber location information is obtained, and delivery of the messaging service message is attempted based on the mobile subscriber location information.

According to another aspect of the subject matter described herein, a method for providing subscriber location information associated with the delivery of messaging service messages is provided. The method includes, at a subscriber location database separate from a network location register, caching mobile subscriber location information based on messages sent to or from the location register. Further, at a messaging service center, a messaging service message addressed to a message recipient is received, a network location register query requesting location information associated with the message recipient is received, and the query is transmitted. Further, at a messaging service subscriber caching function, the query is intercepted, the message recipient location information is extracted from the subscriber location database, and the message recipient location information is provided to the messaging service center.

According to another aspect of the subject matter described herein, a method for delivering a messaging service message to a messaging service subscriber capable of receiving the message via a plurality of networks is provided. The method includes, at a subscriber location database separate from a network location register, caching mobile subscriber location information associated with a plurality of networks based on messages sent to or from location registers in the networks. Further, at an interworking messaging service subscriber caching function, a messaging service message is received, the subscriber location database is queried, mobile subscriber location information associated with at least one of the networks is obtained, at least one of the networks is selected, and a delivery of the message to the at least one selected network using the mobile subscriber location information is attempted.

According to another aspect of the subject matter described herein, a system for messaging service message delivery is provided. The system includes a subscriber location database separate from a network location register for obtaining and storing mobile subscriber location information based on messages sent to or from the network location register. Further, the system includes a messaging service subscriber caching function for receiving a message service message, for obtaining mobile subscriber location information from the subscriber location database and for attempting to deliver the messaging service message based on the mobile subscriber location information received from the subscriber location database.

According another aspect of the subject matter described herein, a system for providing subscriber location information associated with the delivery of messaging service messages is provided. The system includes a subscriber location database separate from a network location register for obtaining and storing mobile subscriber location information based on messages sent to or from the network location register. Further, a messaging service subscriber caching function receives a request for subscriber location information associated with the delivery of a message service message where the request is destined for a network location register. The messaging service subscriber caching function also obtains the requested mobile subscriber location information from the subscriber location database and responds to the received request with the subscriber location information on behalf of the network location register.

According to another aspect of the subject matter described herein, a computer program product comprising computer-executable instructions embodied in a computer-readable medium for performing steps is provided. One step includes, at a subscriber location database separate from a network location register, caching mobile subscriber location information based on messages sent to or from the location register. Further, at a messaging service subscriber caching function, a messaging service message is received, the subscriber location database is queried, mobile subscriber location information is obtained, and delivery of the messaging service message is attempted based on the mobile subscriber location information.

According to another aspect of the subject matter described herein, a computer program product comprising computer-executable instructions embodied in a computer-readable medium for performing steps is provided. One step includes, at a subscriber location database separate from a network location register, caching mobile subscriber location information based on messages sent to or from the location register. Further, at a messaging service center, a messaging service message addressed to a message recipient is received, a network location register query requesting location information associated with the message recipient is received, and the query is transmitted. Further, at a messaging service subscriber caching function, the query is intercepted, the message recipient location information is extracted from the subscriber location database, and the message recipient location information is provided to the messaging service center.

According to another aspect of the subject matter described herein, a computer program product comprising computer-executable instructions embodied in a computer-readable medium for performing steps is provided. One step includes, at a subscriber location database separate from a network location register, caching mobile subscriber location information associated with a plurality of networks based on messages sent to or from location registers in the networks. Further, at an interworking messaging service subscriber caching function, a messaging service message is received, the subscriber location database is queried, mobile subscriber location information associated with at least one of the networks is obtained, at least one of the networks is selected, and a delivery of the message to the at least one selected network using the mobile subscriber location information is attempted.

Exemplary methods and systems for efficient messaging service delivery are described herein as tasks, functions, and processes. It is understood that these tasks, functions, and processes may be implemented in hardware, software, firmware, or any combination thereof. For example, these tasks, functions, and processes may be implemented using computer executable instructions embodied in a computer readable medium for performing the messaging service message delivery process described herein. Exemplary computer readable media suitable for implementing the subject matter described herein includes chip memory devices, optical and magnetic disk memory devices, downloadable electrical signals, application-specific integrated circuits, and programmable logic devices. It is also understood that a computer program product may involve hardware, software, or firmware components located on different computing platforms that interact with each other.

BRIEF DESCRIPTION OF THE DRAWINGS

Preferred embodiments of the subject matter described herein will now be explained with reference to the accompanying drawings of which.

DETAILED DESCRIPTION

The methods and systems described herein for delivering messaging service messages may be implemented using an underlying hardware architecture similar to that of a telecommunications network packet routing switch, such as a signaling system 7 (SS7) signal transfer point (STP) or an SS7/Internet protocol (IP) signaling gateway (SG) routing node. As used herein, the term "signaling gateway" refers to a packet routing node capable of routing signaling messages between nodes of different protocols, such as signaling system 7 (SS7) nodes, asynchronous transfer mode (ATM)-based signaling nodes, and IP-based signaling nodes. Exemplary protocols supported by an SG may include mobile application part (MAP), transaction capabilities application part (TCAP), signaling connection control part (SCCP), SCCP user adaptation (SUA) protocol, message transfer part (MTP), MTP layer 2 user adaptation (M2UA) protocol, MTP layer 3 user adaptation (M3UA) protocol, session initiation protocol (SIP), session description protocol (SDP), transport adaptation layer interface (TALI) protocol, H.323 protocols, RADIUS, DIAMETER, CAMEL, Instant Messaging protocols (e.g., IETF Instant Message and Presence Protocol Working Group (IMPP) Rendez-Vous Protocol (RVP)), and other communication protocols that are intended to or may be adapted to transport messaging service messages.

Figure 4:
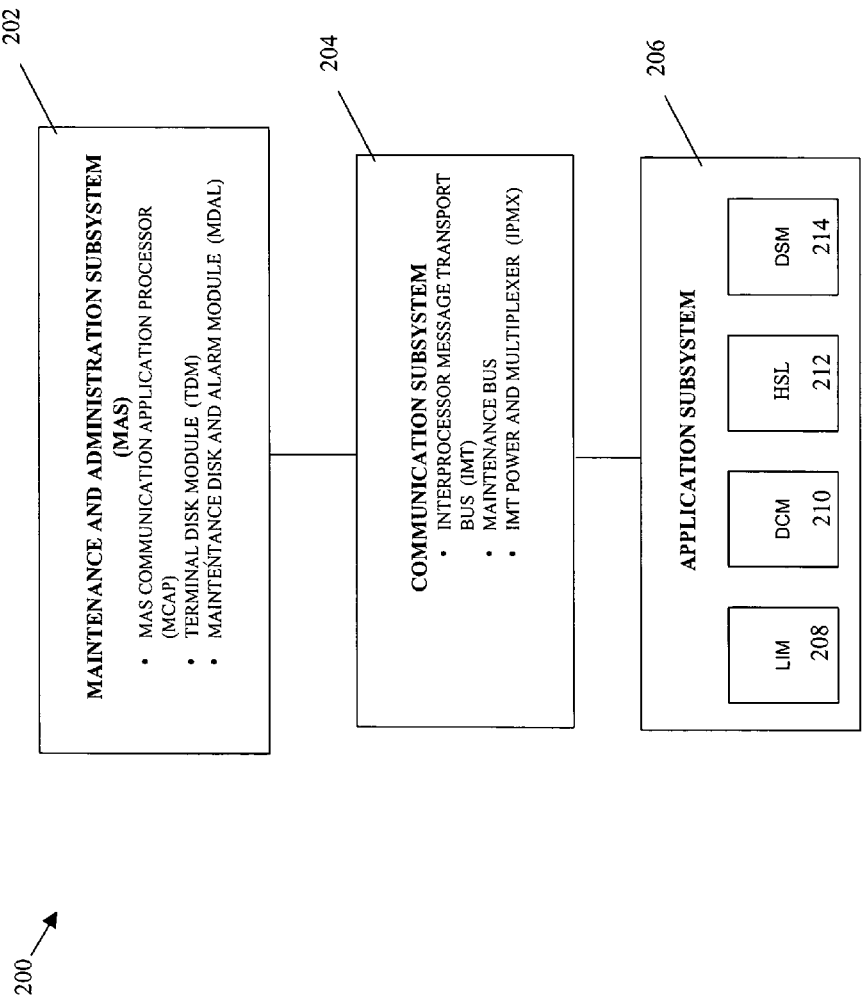
FIG. 4 is a block diagram of a signaling gateway (SG) routing node suitable for use with embodiments of the subject matter disclosed herein.

An exemplary base architecture suitable for use with embodiments of the subject matter disclosed herein includes the EAGLE® STP and the IP$^7$® Secure Gateway, both available from Tekelec of Calabasas, Calif. FIG. 4 is a block diagram of a signaling gateway (SG) system architecture suitable for use with embodiments of the subject matter disclosed herein. In FIG. 4, signaling gateway 200 includes the following subsystems: a maintenance and administration subsystem (MAS) 202, a communication subsystem 204 and an application subsystem 206. MAS 202 provides maintenance communications, program load, peripheral services, alarm processing and system disks. Communication subsystem 204 includes an interprocessor message transport (IMT) bus that is the main communication bus among all subsystems and processor modules in the IP$^7$® Secure Gateway 200. This high-speed communications system may include two 1 Gbps counter-rotating serial rings. In an alternate implementation, communication subsystem 204 may include an Ethernet based switch fabric.

Application subsystem 206 includes application cards capable of communicating with the other cards through the IMT buses. Numerous types of application cards can be incorporated into SG 200, including: a link interface module (LIM) 208 that provides SS7 links and X.25 links, a data communication module (DCM) 210 that provides UDP, TCP, and/or SCTP interfaces to an IP network for the communication of IP-based messages (e.g., M3UA, M2UA, SUA, SIP, H.323, RADIUS, DIAMETER, CAMEL, Presence, Instant Message, etc.), and an ATM-based, high speed link (HSL) module 212 that provides one or more interfaces to an ATM network for communicating similar messages. A database service module (DSM) 214 may also be provided to support a variety of network applications including number portability service, gateway screening service, presence services, SMS, MMS, IM message screening and delivery services, prepaid services, flexible routing services, global title translation services, SIP/SS7 interworking services, messaging service interworking services (e.g., SS7 MAP SMS-to-SIP SMS interworking, etc.), and other network services.

Integrated Routing Node Exemplary Architecture

Figure 5:
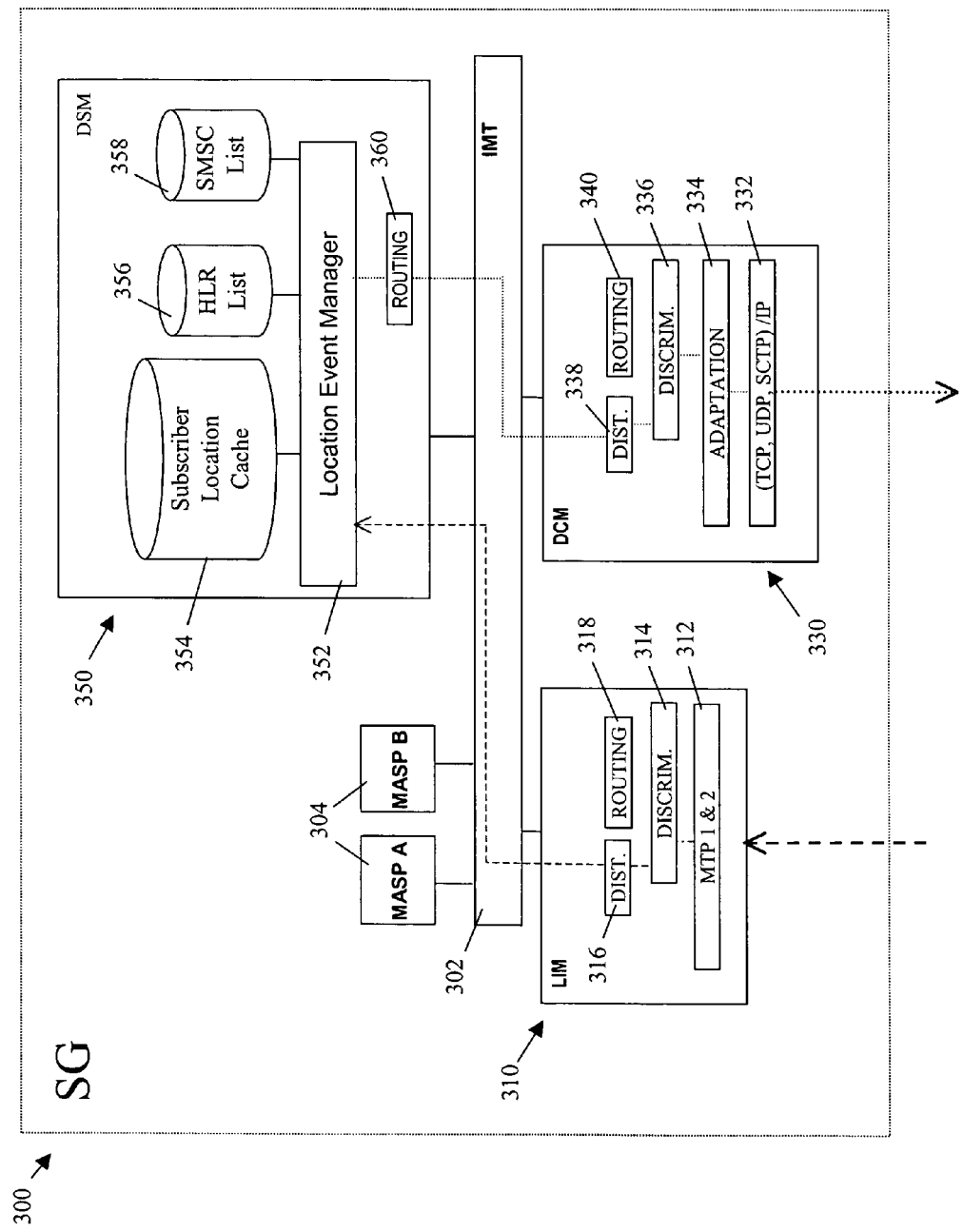
FIG. 5 is a block diagram illustrating an exemplary internal architecture of an SG node that includes a messaging service subscriber cache (MSSC) function according to an embodiment of the subject matter disclosed herein.

FIG. 5 illustrates an SS7/IP signaling gateway (SG) node that is adapted to include an MSSC function according to an embodiment of the subject matter disclosed herein. In FIG. 5, SG 300 includes an interprocessor message transport (IMT) bus 302 that is the main communication bus among internal subsystems within SG 300. In one embodiment, this high-speed communications system includes two 1 Gbps counter-rotating serial rings. A number of distributed processing modules or cards may be coupled to IMT bus 302. In FIG. 5, these cards include: a pair of maintenance and administration subsystem processors (MASPs) 304, an SS7 LIM 310, an IP-capable DCM 330, and a DSM 350, which is adapted to host a messaging service subscriber cache (MSSC) function 340. These modules are physically connected to IMT bus 302 such that signaling and other types of messages may be routed internally between active cards or modules. For simplicity of illustration, only single LIM, DCM, and DSM cards are included in FIG. 5. However, SG node 300 may include multiple LIM, DCM, DSM and other cards, all of which may be simultaneously connected to and communicating via IMT bus 302.

MASP pair 304 provides maintenance communications, initial program load, peripheral services, alarm processing and system disks. Exemplary LIM 310 may include an SS7 MTP level 1 and 2 function 312, an SS7 MTP level 3 discrimination function 314, a distribution function 316, and a routing function 318. MTP level 1 and 2 function 312 includes hardware and software for sending and receiving digital data over a particular physical medium. For example, MTP level 1 and 2 function may provide error detection, error correction and sequenced delivery of SS7 message packets.

MTP level 3 discrimination function 314 performs discrimination operations, which may include determining whether a received message is to be allowed into the SG system and determining whether the received message packet requires processing by an internal processing subsystem or is simply to be through switched (i.e., routed on to another node in the network). As such, discrimination function 314 may effectively provide SG 300 with a network firewall. Discrimination function 314 may examine received message parameters, including message transfer part (MTP) routing label parameters, signaling connection control part (SCCP) layer parameters, transaction capabilities application part (TCAP) layer parameters, and mobile application part (MAP) layer parameters. Exemplary discrimination parameters include origination point code (OPC)/destination point code (DPC) parameters, a service indicator (SI) parameter, SCCP called and calling party address parameters, an SCCP subsystem (SSN) parameter, a translation type (TT) parameter, a MAP operation code (OpCode) parameter, and others. Discrimination based on these parameters enables function 314 to determine whether internal processing is required. In one implementation, discrimination function 314 may copy a received signaling message, such that the original message may be routed to the target destination and the message copy may be processed by one or more processing subsystems associated with the SG.

Distribution function 316 handles the internal routing of message packets that require additional processing prior to final routing. Such messages may include signaling messages associated with SMS, MMS, or IM services, as well as mobility management messages. Routing function 318 may access network routing rule information and apply these rules to messages that require routing.

DCM 330 includes an IP transport function 332, a signaling protocol adaptation/translation function 334, a distribution function 336, and a routing function 338. IP transport function 332 includes hardware and software for implementing OSI layers 1-3. For example, IP transport function may implement a physical layer protocol, such as Ethernet, a network layer protocol, such as IP, and a transport layer protocol, such as transmission control protocol (TCP), user datagram protocol (UDP), and/or stream control transmission protocol (SCTP). According to one exemplary embodiment of the subject matter disclosed herein, adaptation and translation function 334 may receive a signaling message from an IP network that is formatted according a first signaling protocol (e.g., M3UA), and adapt or reformat the message into a second signaling protocol (e.g., MTP). It will be appreciated by those skilled in the art that M3UA is considered to be a protocol for adapting native SS7 signaling messages for transport via an IP communication link. According to another exemplary mode of operation, function 334 may receive a signaling message, such as a SIP message, and translate the SIP message into an equivalent SS7 or SS7-adaptation protocol message, and vice-versa. These adaptation and translation processing operations may be performed on in-bound and out-bound signaling messages. In yet another embodiment of the subject matter disclosed herein, an adaptation and translation function similar to function 334 may be located on LIM and HSL communication modules, thereby enabling signaling message adaptation and translation operations to be performed on some or all LIM and HSL interfaces in an SG routing node.

Discrimination function 336 performs discrimination operations similar to those described above with respect to function 314, and as such discrimination function 336 may provide SG 300 with a network firewall. In addition to the SS7 and SS7-adaptation protocol discrimination parameters described above, discrimination function 336 may also examine received SIP message parameters including a To parameter, a From parameter, a Via parameter, a source IP address parameter, a destination IP address parameter, and others. Discrimination based on these parameters enables function 336 to determine whether screening or internal processing is required. According to one embodiment, discrimination function 336 may copy a received signaling message, such that the original message may be routed to the target destination and the message copy may be processed by one or more processing subsystems associated with the SG. Distribution function 338 handles the internal routing of message packets that require additional processing prior to final routing. Such messages may include signaling messages associated with SMS, MMS, or IM services (e.g., SIP INFO message, SIP MESSAGE message, SIP INVITE message, etc.), as well as mobility management messages. Routing function 340 is adapted to access network routing rule information, which may include SS7 and IP network routing rules, and apply these routing rules to messages that require routing.

In general, a DSM card 350 includes hardware and software for processing mobility management signaling messages and temporarily caching mobile subscriber location management information. Exemplary messages from which location management information may be extracted include GSM MAP UpdateLocation messages, IS-41 RegistrationNotification messages, DIAMETER ServerAssignmentRequest/Answer messages and DIAMETER LocationInfoRequest/Answer messages. DSM 350 is also adapted to receive and process messaging service messages, using the cached mobile subscriber location management information to facilitate a first delivery attempt of the messaging service messages. Examples of messaging service messages that may be processed in this manner include MAP ForwardShortMessage messages, SIP INFO messages, and SIP MESSAGE messages.

In another embodiment, DSM 350 may receive and process mobility management query messages, such as GSM MAP query message (e.g., a SendRoutingInfoForShortMessage message) or a DIAMETER query message (e.g., LocationInfoRequest/Answer), using the cached mobile subscriber location management information to generate a response to the received query message.

DSM 350 includes a messaging service subscriber cache (MSSC) location event manager 352 that is adapted to receive messages from a communication module (e.g., LIM, DCM, HSL) and perform one or more MSSC processing operations on the messages. Location event manager may access the various databases, caches, and data structures associated with the MSSC function/application residing on DSM 350. Message processing operations associated with location event manager 352 are described in more detail below. Also included on exemplary DSM 350 is a subscriber location information cache 354, which may be implemented using a variety of data storage technologies, including a random access memory (RAM) buffer, a magnetic data storage device, or an optical data storage device. Furthermore, in an alternate embodiment, cache 354 may be located on a different SG processor module, on an adjunct processing subsystem that is communicatively coupled to the SG node, or on another network element, such as a network application server or service control point. Table 1 presented below illustrates exemplary information that may be contained in a subscriber location information cache. Cache 354 may contain international mobile station identifier (IMSI), temporary or local mobile station identifier (LMSI), a mobile subscriber ISDN (MSISDN) identifier, a mobile switching center (MSC) identifier, an IMS subscriber identifier, and an IMS serving call state control function (S-CSCF) identifier.

control function (S-CSCF) node, or a SIP server, which may be identified by a network alias identifier, a URL, an IP address, or some other routable network address.

Although not illustrated in Table 1 above, a subscriber location cache according to one embodiment of the subject matter disclosed herein may include date and time stamp information that is associated with each entry. As subscriber location information is updated, date/time stamp information is also updated to reflect the time of the last record update. This date/time stamp information may be used to determine when a subscriber location entry has "aged out" or expired.

DSM 350 further includes a home location register (HLR)/HSS database 356, which contains a listing of HLR/HSS entities that are to be off-loaded or shielded by the subject matter disclosed herein. In one typical operational scenario, the listing of HLR/HSS nodes in database 356 would include those HLR/HSS nodes owned by the network operator that owns or operates the SG node of the subject matter disclosed herein. As such, a network operator that deploys an SG node in accordance with the teachings of the subject matter disclosed herein could control and effectively reduce the volume of messaging service-related query traffic to their HLR/HSS nodes. Shown below in Table 2 is exemplary information that may be stored in HLR/HSS listing database 356. HLR and HSS identifiers may include a network entity address, a network alias address, a URL, a routable network address, or other HLR or HSS identifying parameter. According to one embodiment, HLR/HSS listing database 356 includes information that associates an HLR ID (or range of HLR IDs) with a particular DSM application processor that is designated to provide MSSC caching service for that HLR (or range of HLRs). The exemplary serving DSM identifier information shown in Table 2 is an

TABLE 1

Exemplary Subscriber Location Information

| IMSI | LMSI | MSISDN | MSC ID | IMS Subscriber ID | S-CSCF ID |
|---|---|---|---|---|---|
| 9194203333 | — | — | 9193804547 | — | — |
| — | 9195474588 | — | 9193804787 | — | — |
| — | — | — | — | Joe@Tekelec.com | 10.10.2.10 |

With further regard to the exemplary subscriber location information illustrated in Table 1, it will be appreciated that the information stored in cache 354 is intended to identify a mobile subscriber or mobile terminal and the associated communications network element that is believed to be servicing the subscriber/terminal. In a GSM wireless network environment, the mobile subscriber/station identifier may be an IMSI or LMSI identifier. In an ANSI IS-41 wireless network environment, the mobile subscriber/station identifier may be a MSISDN identifier. In an IP multimedia subsystem environment, the mobile subscriber/station identifier may be an IP address, a URL, a MAC address, an electronic mail address, a short code identifier, or any other identifying parameter contained in the To field of a SIP message. Likewise, in GSM and IS-41 wireless network environments, the communications network element that is believed to be serving the subscriber/terminal may be an MSC, which is identified by an MSC entity address or a routable network address. In an IMS network environment, the communications network element that is believed to be serving the subscriber/terminal may be a serving call state internal communication bus (IMT bus) address, however, it will be appreciated that serving DSM (or serving MSSC application server) information may include, but is not limited to, a card slot address, an SS7 point code address, a uniform resource locator (URL), an IP address, or a MAC address.

TABLE 2

HLR/HSS Listings

| HLR ID | HSS ID | SERVING DSM |
|---|---|---|
| 9194601111 | — | 2205 |
| 9194610000 | — | 3406 |
| — | HSS_1@Verizon.net | 3602 |

According to one embodiment of the subject matter disclosed herein, location event manager 352 is adapted to receive and process a mobility management signaling message that contains location and/or service profile information associated with a mobile subscriber and use information contained in the message to update location and/or service profile information associated with the mobile subscriber in cache 354. Updating subscriber location/profile information may additionally include accessing a database 358, which contains a listing of SMSC and/or messaging server (MS) network elements that are adapted to provide messaging services for the mobile subscriber and forwarding the updated location and/or service profile information associated with the mobile subscriber to one or more of the SMSC/MS network elements. It will be appreciated the term "messaging server," as used herein, refers to a network element that is adapted to provide messaging service in a 3G networking environment (e.g., IMS network). A messaging server may be adapted to support messaging service (e.g., text, chat, multimedia messaging) via IP-based signaling protocols, such as SIP. In one typical operational scenario, the listing of SMSC/MS nodes in database 358 would include those mobile terminated SMSC (MT SMSC) nodes owned by the network operator that owns or operates the SG node of the subject matter disclosed herein. The term "messaging service center," as used herein is intended to refer to generically to a node that can deliver messaging service messages in a 2G and/or 3G network environment.

As such, a network operator that deploys an SG node in accordance with the subject matter disclosed herein may further control and effectively reduce the volume of messaging service-related query traffic to the network operator's HLR nodes by directly updating temporary subscriber location/profile caches associated with some or all of the network operator's MT SMSC elements. In this manner, a MT SMSC node is able to perform a first SM delivery attempt using cached location/profile information associated with the SM recipient, thereby eliminating the need to query the recipient mobile subscriber's HLR node to obtain SM delivery location information.

An exemplary SMSC/MS listing database 358 may include information such as that presented below in Table 3.

out"/expired entries via the use of date/timestamp information that is maintained by cache 354. Location event manager 352 is also adapted to perform re-formatting/normalization operations on a message recipient identifier, such as an IMSI identifier, prior to accessing cache 354. For instance, the mobile subscriber identification number associated with an incoming signaling message packet may be converted from a first industry standard format, such as E.214, to a second industry standard format, such as E.212, prior to cache lookup operations. Such mobile subscriber identification number conditioning services may be necessary only in the case that the format of the incoming message mobile subscriber identification number is not consistent with the corresponding key field data format in the location information cache.

As mentioned previously, it will be appreciated that in an alternate embodiment of the subject matter disclosed herein, the processing functions and operations described above with respect to DSM 350 may be implemented in an adjunct message processing system that is coupled to a network routing node via one or more communication links. In this case, the network routing node is adapted to provide either a received mobility management message or a copy of the received mobility management message to the adjunct MSSC message processing platform, where message processing and information caching similar to that described above is performed. In this embodiment, the adjunct processing platform may also receive copies of signaling messages from external communication link monitoring probes that are placed at various locations in a signaling network (e.g., on links connected to HLR nodes, on link connected to SMSC nodes).

Mobility Management Message Processing

According to one aspect of the subject matter disclosed herein, mobile subscriber location information is collected

TABLE 3

SMSC/MS Listings

| SMSC ID | Messaging Server ID | Network Address | Subscriber Range Start | Subscriber Range End |
|---------|---------------------|-----------------|------------------------|----------------------|
| 9192345434 | — | 245-10-25 | 9193800000 | 9197809999 |
| 9193687990 | — | 245-10-36 | 9192450000 | 9195609999 |
| — | MsgSer1@Verizon.com | 10.12.1.1 | — | — |

In Table 3, each entry includes an SMSC ID field, a messaging server ID field, a network address field, and subscriber range start and end fields. The SMSC and MS identifiers in Table 3 may include a network entity address or other SMSC- or MS-identifying parameter. The network address in each entry in Table 3 may be an SS7 point code, an IP address, a uniform resource locator (URL), or other type of routable network address or network alias address. According to one embodiment, SMSC/MS listing database may associate a range of mobile subscriber identifiers (e.g., MSISDN, IMSI, etc.) with each SMSC/MS entry. Such subscriber may be used to more precisely identify those SMSC/MS elements that are notified of a change in location status associated with a particular mobile subscriber.

Location event manager 352 is adapted to administer provisioning of HLR/HSS and SMSC/MS listing databases 356 and 358, respectively, and perform housekeeping services with respect to cache 354, such as the deletion of "aged and cached for later use in the delivery of messaging service messages, including SMS, MMS, and IM messages. As discussed above, in one embodiment, a network routing node such as an SS7-IP signaling gateway may be adapted to perform mobility management message collection and caching operations in a signaling network.

Figure 1:
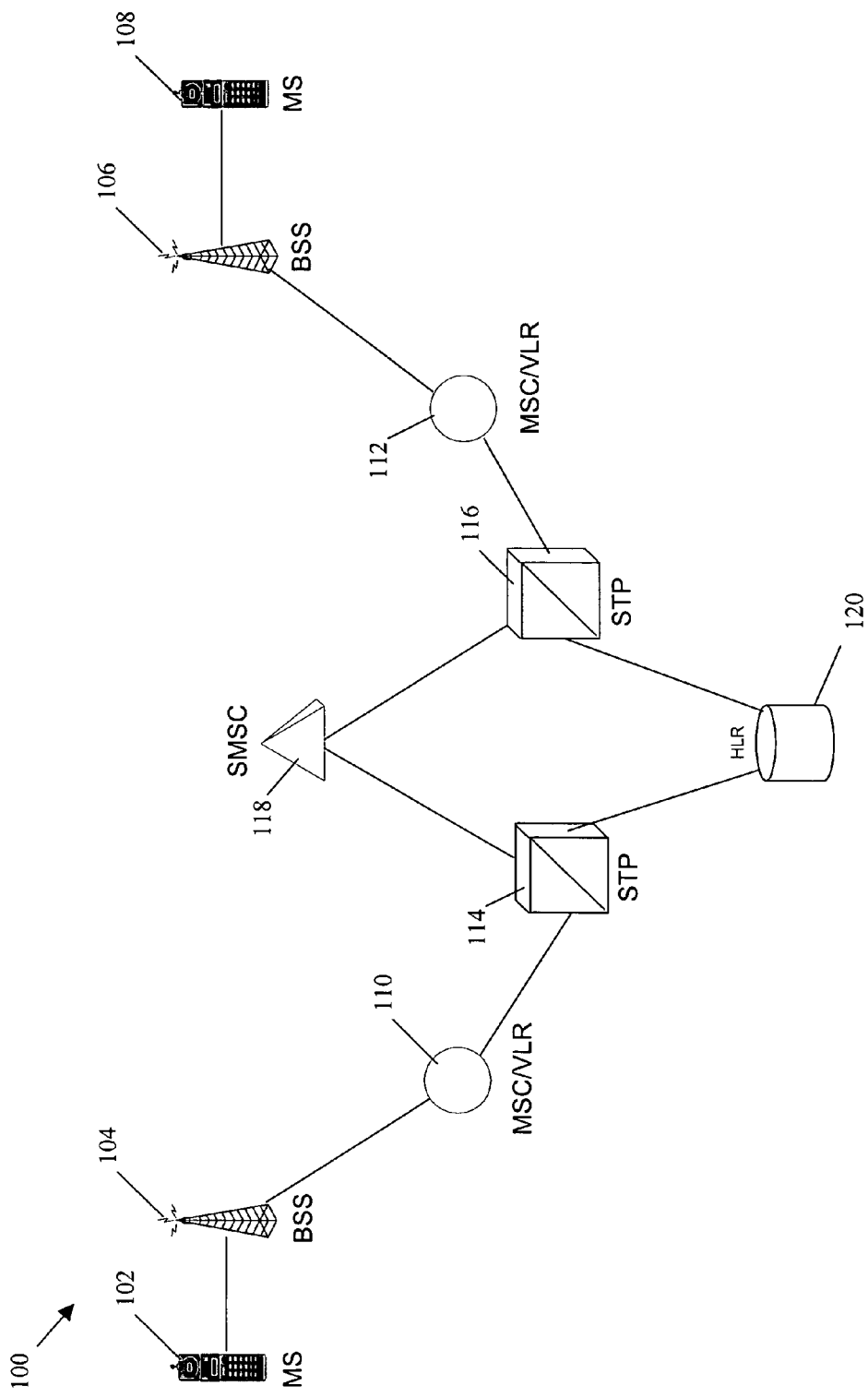
FIG. 1 is a network diagram illustrating a mobile telecommunications network architecture and associated network elements.
Figure 2:
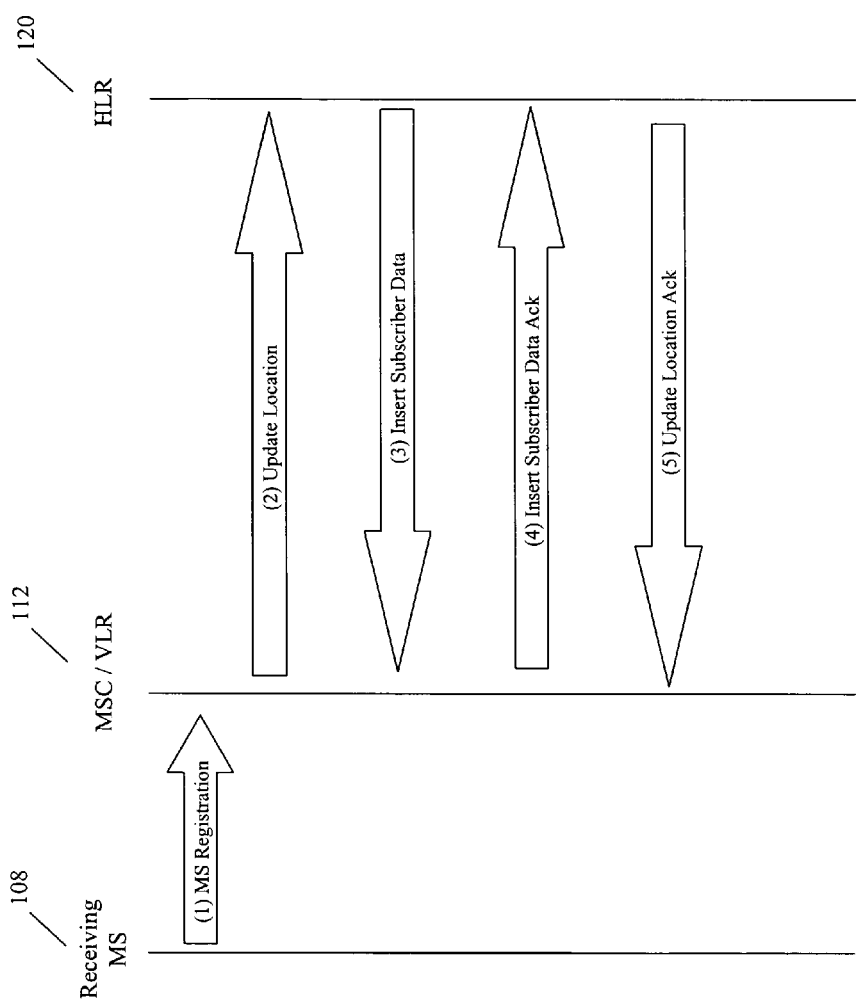
FIG. 2 is a message flow diagram illustrating an exemplary mobility management transaction involving several mobile telecommunications network elements.
Figure 3:
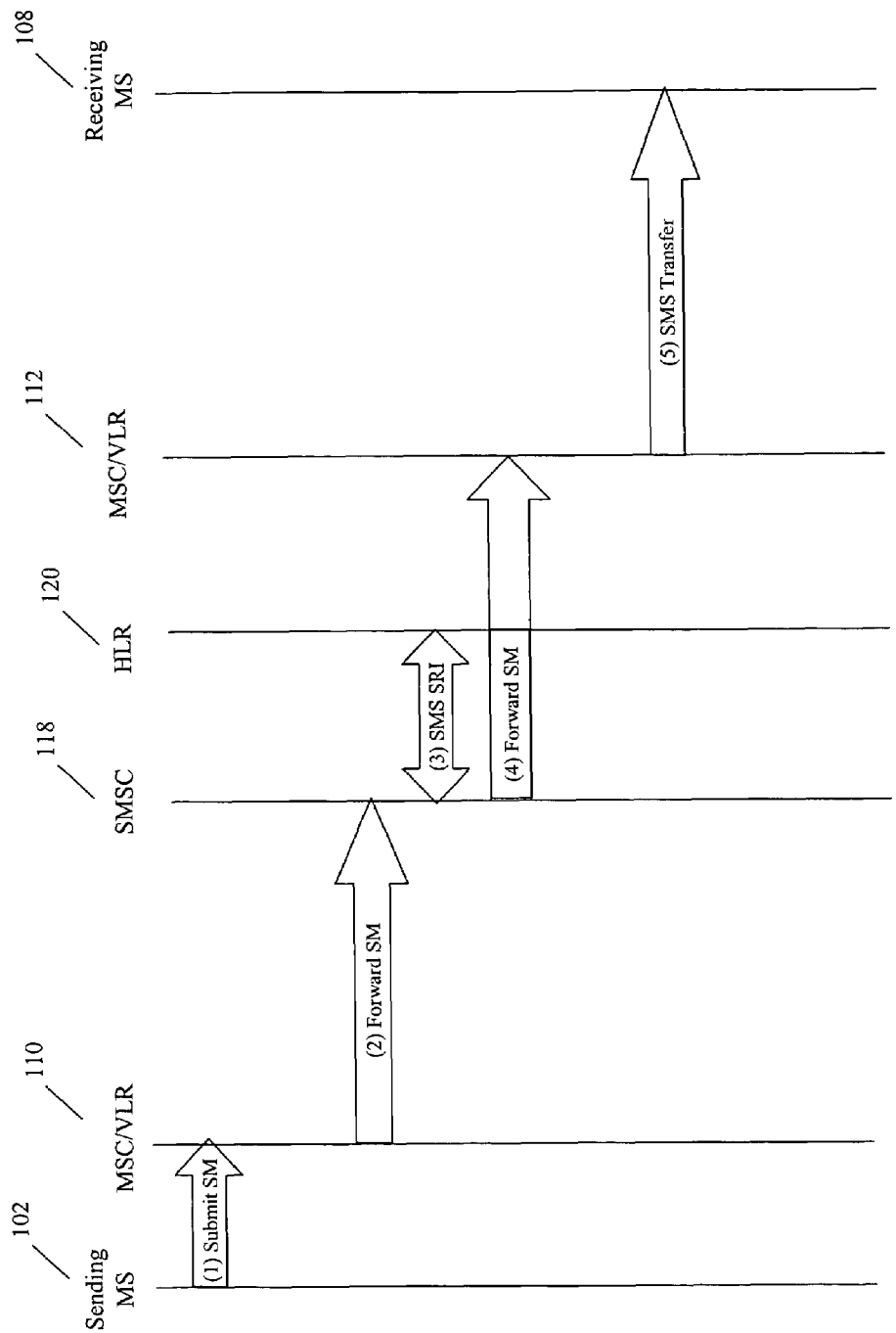
FIG. 3 is a message flow diagram illustrating an exemplary short message service (SMS) delivery transaction involving several mobile telecommunications network elements.
Figure 6:
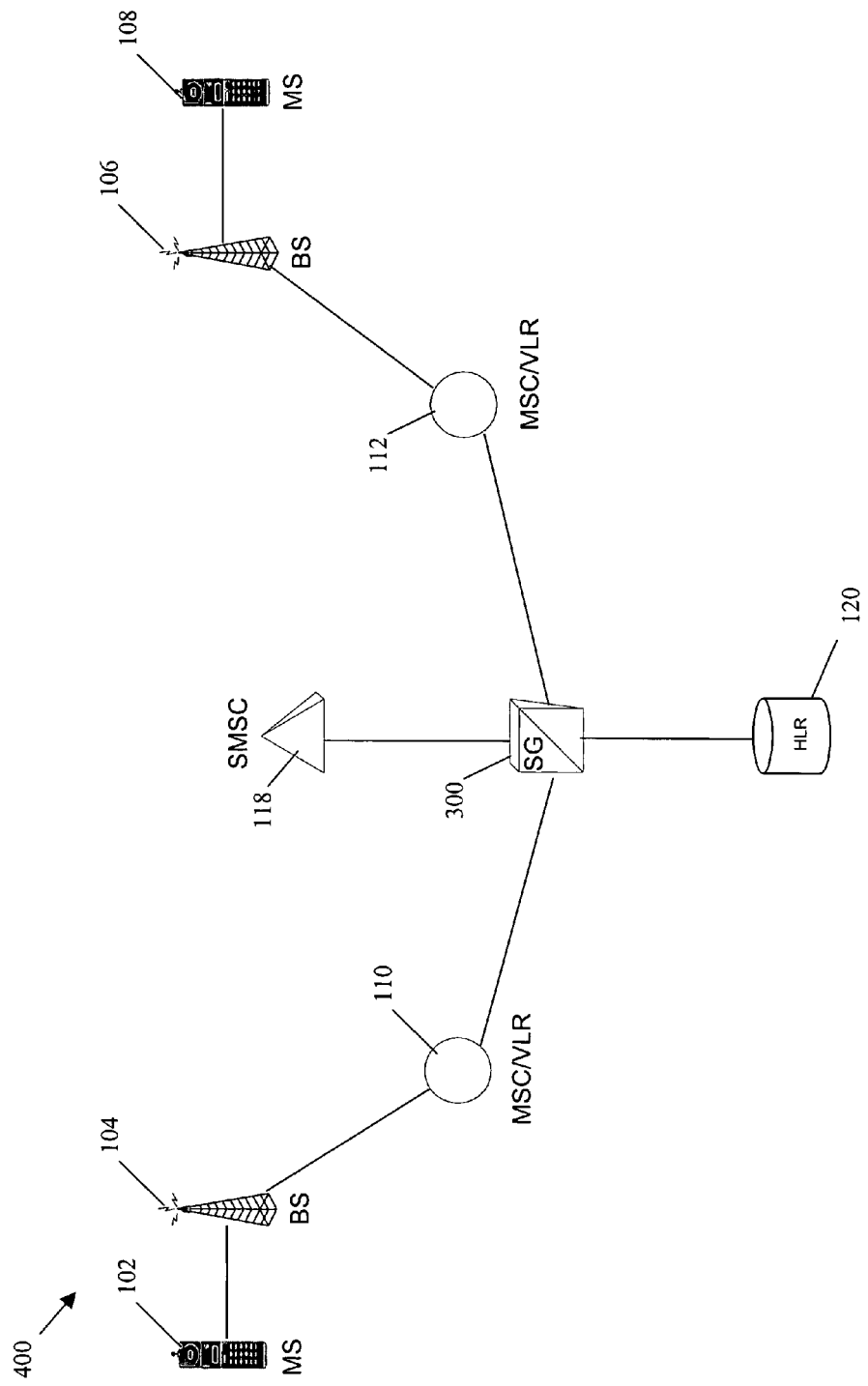
FIG. 6 is a network diagram illustrating an exemplary GSM network that includes a SG routing node according to one embodiment of the subject matter disclosed herein.
Figure 7:
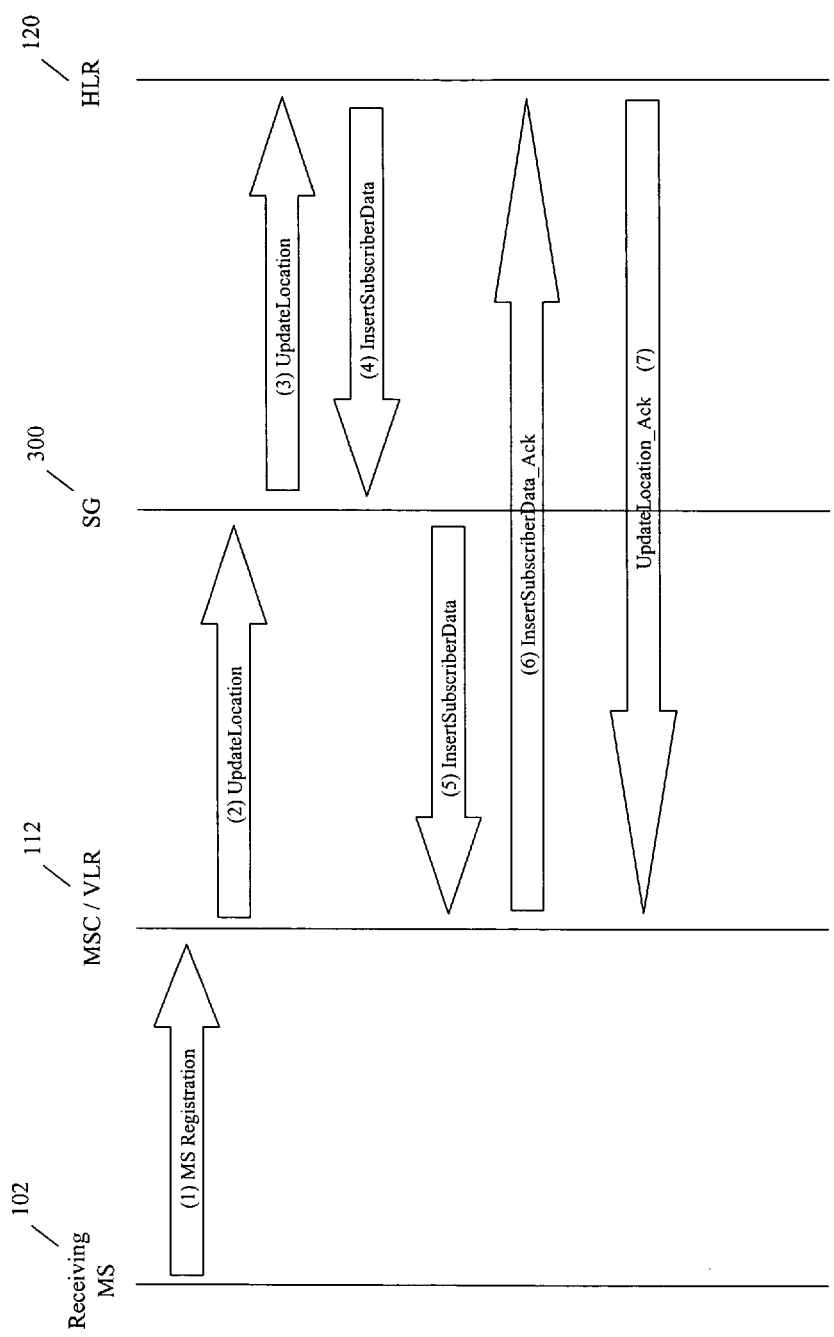
FIG. 7 is a message flow diagram that illustrates exemplary processing of a GSM mobile subscriber mobility management message by an SG routing node of the subject matter disclosed herein.

FIG. 6 illustrates an exemplary GSM wireless network 400 that is includes similar elements to network 100 illustrated in FIG. 1. However, unlike the network in FIG. 1 that includes STPs 112 and 116 that perform only message routing functions, network 400 includes SG 300 described above with respect to FIG. 5. SG 300 is connected to MSC/VLR 110, MSC/VLR 112, SMSC 118, and HLR 120 via one or more communication links (e.g., SS7, IP, or ATM links) and as such is adapted to receive, process, and route signaling messages that are transmitted between the nodes. FIG. 7 illustrates an exemplary mobility management messaging scenario associated with network 400, while Figures and 8A-8C describe exemplary MSSC processing operations performed by SG 300.

Beginning with the mobility management messaging scenario that is illustrated in FIG. 7, in line 1, receiving MS 102 registers with MSC/VLR 112. In line 2, MSC/VLR 112 generates and transmits a MAP UpdateLocation message associated with mobile subscriber 102 to the subscriber's HLR 120. UpdateLocation notifications may also be triggered by the roaming of a registered mobile subscriber within a network.

Figure 8A:
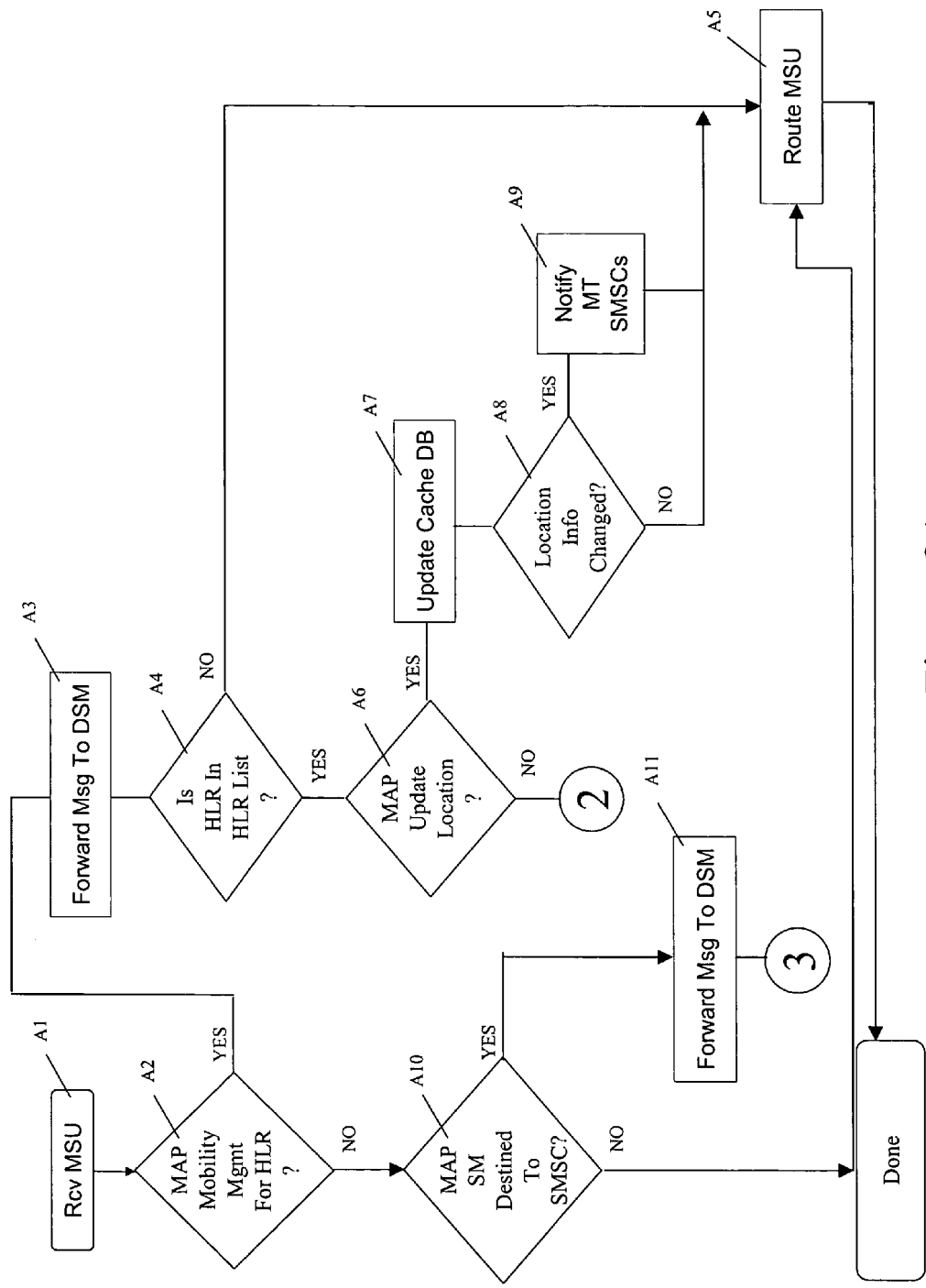
FIGS. 8A-8C are a flow chart associated with a messaging service subscriber caching (MSSC) function according to an embodiment of the subject matter disclosed herein.
Figure 8B:
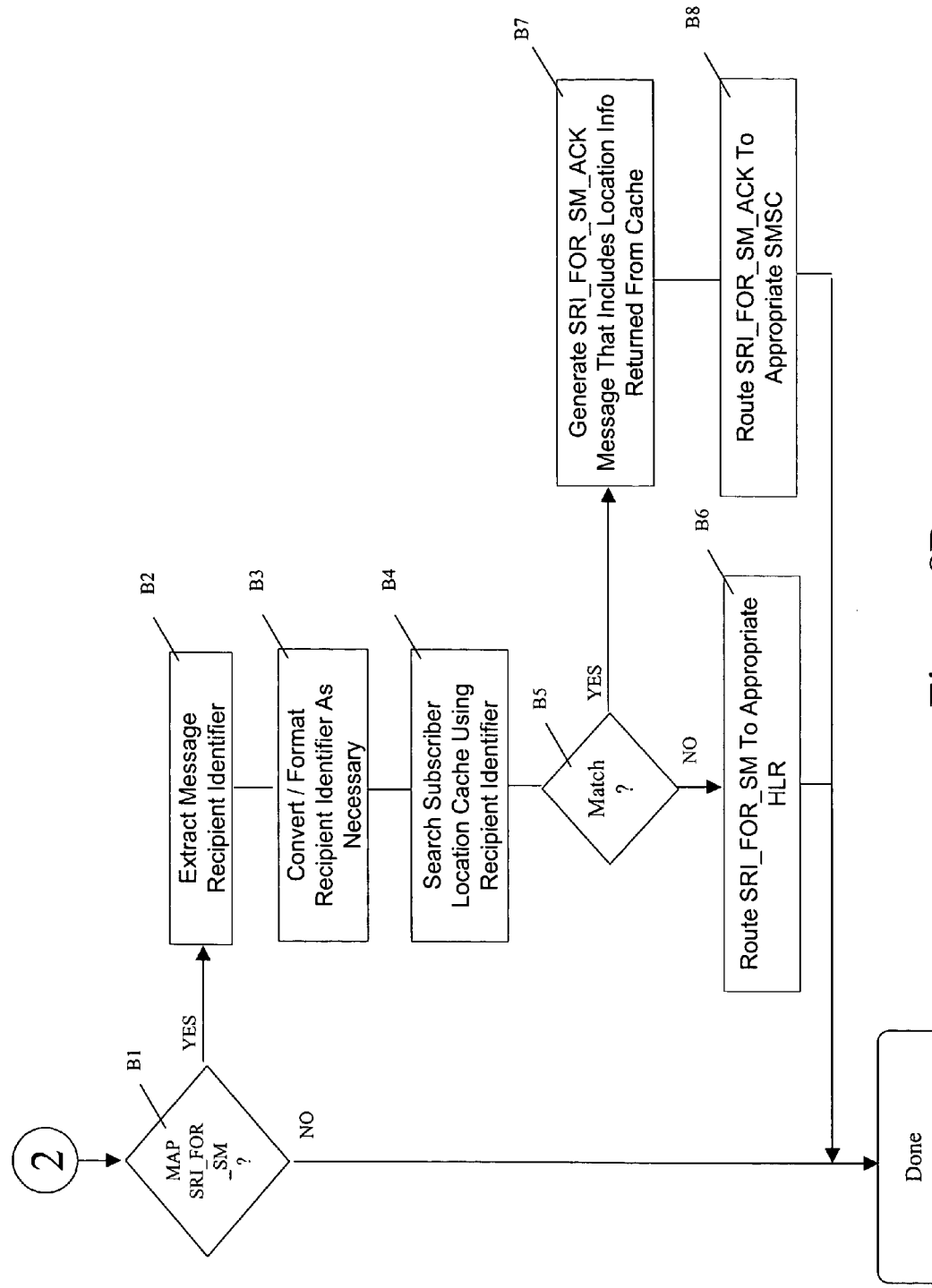
Figure 8C:
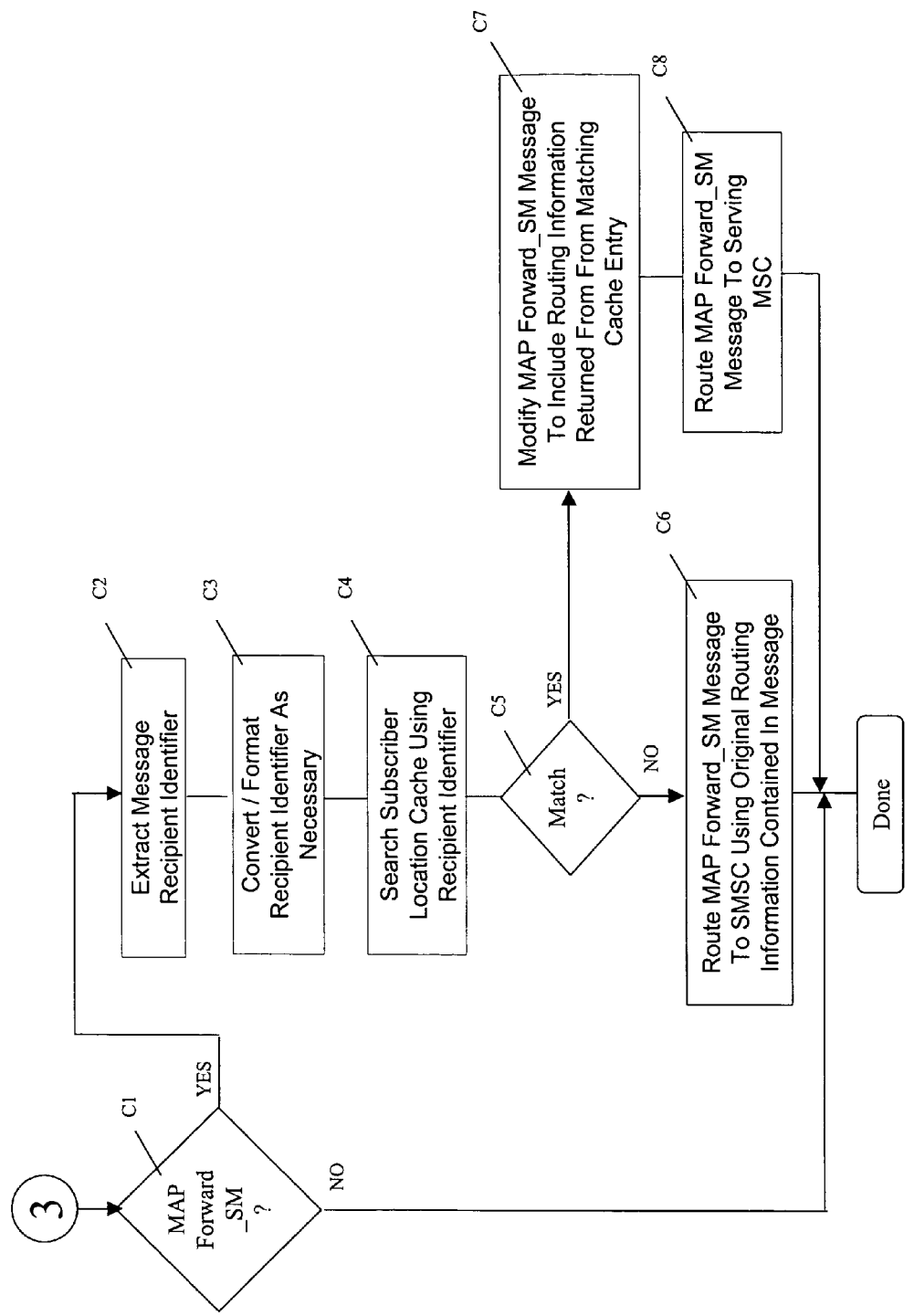

The UpdateLocation message is received by SG 300, and internal message processing as described in FIGS. 8A-8C proceeds. Beginning with step A1 in FIG. 8A, the MAP UpdateLocation message signaling unit (MSU) is received by an SG communication module such as a LIM, DCM, or HSL. In one embodiment, the receiving communication module is adapted to determine whether the received message is a MAP mobility management message that is destined for an HLR (step A2). A discrimination process on the receiving communication module may examine a signaling connection control part (SCCP) subsystem (SSN) parameter (e.g., SSN=6) to identify messages intended for an HLR. A MAP OpCode parameter may be examined to identify the type of MAP message (e.g., MAP OpCode=2=UpdateLocation message). Messages that satisfy this discrimination criteria are forwarded to a DSM module for further processing, as indicated in step A3. It will be appreciated that in an alternate embodiment some or all of the discrimination processing described above may be performed on the DSM module. In step A4, the HLR/HSS database is checked to determine whether the MAP message is destined for a HLR/HSS entity on the list. Those skilled in the art will appreciate that global title translation (GTT) processing of the SCCP MAP (or SUA MAP) message may be required prior to performing the HLR/HSS database lookup. Accordingly, DSM 350 may additionally be equipped with a GTT database.

If the MAP message is not destined for an HLR/HSS entity listed in database 356, then the MAP message is routed from SG 300 to the HLR destination (step A5). If, however, the MAP message is destined for an HLR/HSS entity listed in database 356, then a check is next performed to determine whether the message is an UpdateLocation message, as indicated in step A6. This determination may be made through examination of a MAP OpCode parameter (e.g., MAP OpCode=2=UpdateLocation message).

If the message is determined to be a MAP UpdateLocation message, then mobile subscriber identification (e.g., IMSI, LMSI) and mobile subscriber location information (e.g., serving MSC/VLR ID) are extracted from the message and used to update subscriber location cache 354, as indicated in step A7. Additional steps A8 and A9 may be performed to notify SMSC nodes identified in SMSC/MS database 358 of the updated subscriber location information. In one embodiment, SMSC nodes are notified only if the updating subscriber location information is different from the existing location information stored in the cache. Once cache updating is complete, the UpdateLocation message is routed to HLR 120 as indicated in line 3 of FIG. 7.

It will be appreciated that other MAP mobility management messages, including CancelLocation (OpCode=3), InsertSubscriberData (OpCode=7), and SendRoutingInfo (OpCode=16), may also be intercepted by an SG routing node of the subject matter disclosed herein. Exemplary InsertSubscriberData message interception by SG 300 is illustrated in FIG. 7 in lines 5 and 6 of FIG. 7. More particularly, SG 300 may extract mobile subscription information from the InsertSubscriberData message in line 5, the InsertSubscriberData Ack message in line 7, or the UpdateLocation Ack message in line 8. Subscriber profile and location information extracted from these and other mobility management messages may be temporarily cached and subsequently used to route messaging service messages.

Returning to step A6 of the exemplary MAP message processing flow diagram shown in FIG. 8A, it will be appreciated that if the MAP message is not an UpdateLocation message, processing proceeds to step B1 of FIG. 8B. In this case, a check is made to determine whether the message is a MAP SendRoutinginfoForShortMessage message (OpCode=45). If the message is not a SendRoutingInfoForShortMessage message then processing is stopped, and the message may be routed from the SG node. If, however, it is determined that the message is a SendRoutingInfoForShortMessage message, then the mobile subscriber identifier associated with the query is extracted from the message and re-formatted as necessary, as indicated in steps B2 and B3, respectively. The subscriber location cache 354 is then searched using the mobile subscriber identifier (e.g., IMSI, MSISDN, etc.), as per step B4. If no match is found (step B5), then in step B6, the SendRoutingInfoForShortMessage query message is routed on to or towards the HLR destination specified in the message. In this case, SG 300 attempts to shield the HLR recipient of the SendRoutingInfoForShortMessage message from the query but is not able to do so because routing/location information for the associated mobile subscriber is not contained in the cache.

Returning to step B5, if a match is found in cache 354, control proceeds to step B7 where a SendRoutingInfoForShortMessage_Ack (SRI for SM Ack) message is generated in response to the SendRoutingInfoForShortMessage query message. The SRI for SM Ack message includes routing/location information for the associated mobile subscriber that is obtained from the cache 354. The SRI_SM ACK message is then routed back to the MSC that originated the SendRoutingInfoForShortMessage query message (step B6). The original SendRoutingInfoForShortMessage query message is terminated or discarded by SG 300. In this case, SG 300 shields an HLR from a portion of signaling message traffic by intercepting and responding to messaging-service-related routing information query requests on behalf of the HLR.

Figure 9:
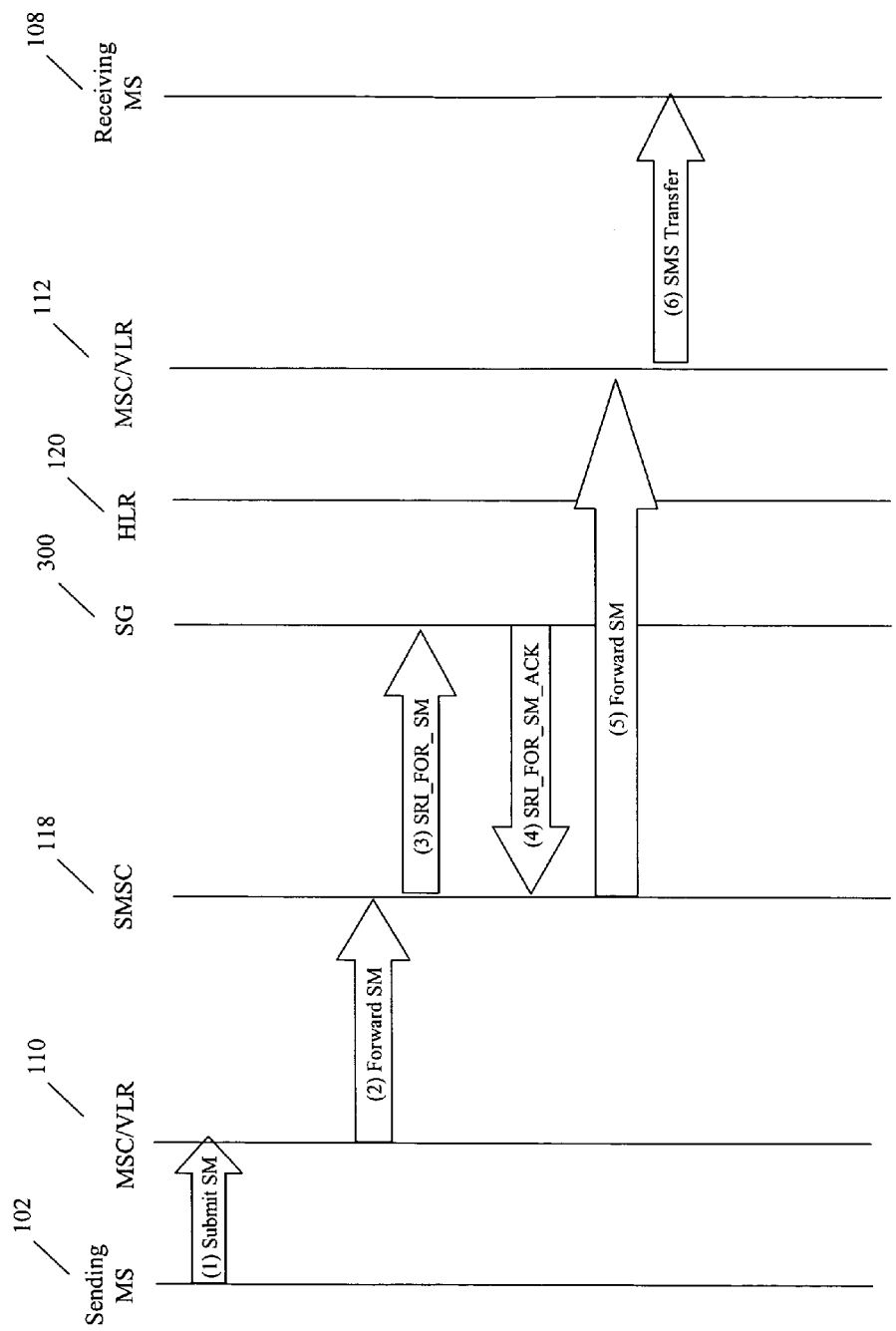
FIG. 9 is a signaling network message flow diagram that illustrates exemplary processing of a GSM mobile subscriber routing information query message by an SG routing node of the subject matter disclosed herein.

A message flow diagram associated with the SendRoutingInfoForShortMessage processing scenario described above is presented in FIG. 9. Referring to FIG. 9, in line 1, a short message is submitted by subscriber 110 to MSC/VLR node 110. In line 2, MSC/VLR 114 generates an associated MAP ForwardShortMessage message and transmits the message to SMSC 118. SMSC 118 receives the message and formulates a MAP SendRoutingInfoForShortMessage query message (line 3), which is addressed to and destined for HLR 120. SMSC 118 transmits the SRI message to SG 300 for routing. SG 300 intercepts and processes the SRI for SM message using cached subscriber location information, as described in detail above and responds to SMSC 118 with a SRI for SM Ack message (line 4). SMSC 118 receives and processes the message and in line 5 uses subscriber location information contained therein to route MAP ForwardShortMessage message to serving MSC/VLR node 124. MSC/VLR node 124, in turn, delivers the MAP short message content to the recipient mobile subscriber via the message illustrated in line 6.

Cache-Based First Delivery Attempt Routing

Returning to step A2 in FIG. 8A, if it is determined that a received MAP message is not a mobility management message destined for an HLR subsystem, then a check is performed in step A10 to determine whether the message is a MAP short message service message that is destined for an SMSC. If the message is not a MAP short message service message that is destined for a SMSC, then the message is routed to its destination (step A5).

If, however, it is determined that the message is a MAP short message service message that is destined for an SMSC, control proceeds to step A11 where the message is forwarded to a DSM. Control then proceeds to step C1 of FIG. 8C. In step C1, a check is made to determine whether the message is a ForwardShortMessage message (MAP OpCode=46). If the message is not a ForwardShortMessage message then processing is stopped, and the message may be routed from the SG node.

If, however, it is determined that the message is a ForwardShortMessage message, then the mobile subscriber recipient identifier associated with the message is extracted and re-formatted as necessary, as indicated in steps C2 and C3, respectively. The subscriber location cache 354 is then searched using the mobile subscriber recipient identifier (e.g., IMSI, MSISDN, etc.), as indicated by step C4. In step C5, it is determined whether a match is located. If no match is found, control proceeds to step C6, where the ForwardShortMessage message is routed to the SMSC destination specified in the message. Once the serving SMSC receives the ForwardShortMessage message, the SMSC will query the HLR for location information associated with the short message recipient. In this case, SG 300 attempts to shield both the serving SMSC and the serving HLR associated with the message recipient, but is not able to do so because routing/location information for the associated short message recipient is not contained in the cache.

Returning to step C5, if a match is found in cache 354, the ForwardShortMessage message is modified to include routing/location information return by the matching cache entry (step C7), and the modified ForwardShortMessage message is routed to the MSC that is believed to be serving the short message recipient (step C8). As such, SG 300 is adapted to shield SMSC nodes from at least a portion of ForwardShortMessage signaling traffic in a network and also to shield HLR nodes from at least a portion of messaging service-related location query (e.g., SRI_For_SM) traffic in a network.

Figure 10:
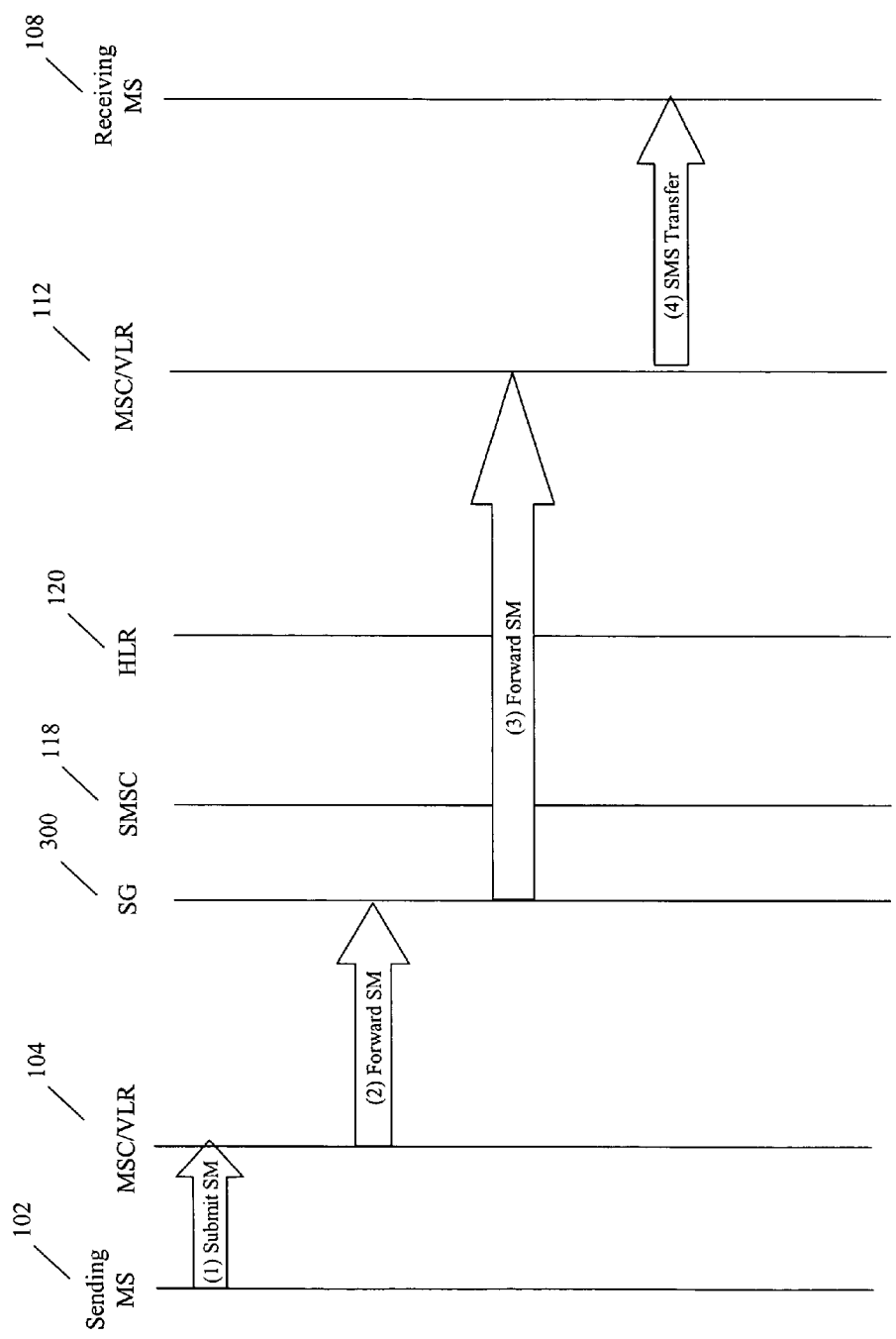
FIG. 10 is a signaling network message flow diagram that illustrates exemplary processing of a GSM short message service message by an SG routing node of the subject matter disclosed herein.

A message flow diagram associated with the MAP ForwardShortMessage processing scenario described above is presented in FIG. 10. In this message flow, a short message is submitted by subscriber 110 to MSC/VLR node 114, as indicated in line 1. In line 2, MSC/VLR 114 generates an associated MAP ForwardShortMessage message, which is addressed to and destined for SMSC 118. In line 3, MSC/VLR 114 transmits the message to SG 300 for routing. SG 300 intercepts and processes the message using cached subscriber location information, as described in detail above. In line 4, SG 300 forwards the MAP ForwardShortMessage message (M3) to serving MSC/VLR node 124 without accessing HLR 120 for location information. In line 4, MSC/VLR node 124 delivers the MAP short message content to the recipient mobile station.

It will be appreciated that if the first delivery attempt performed by SG 300 fails, the messaging service message may be forwarded to a message service center (e.g., SMSC or SIP messaging server), where store and forward processing may be utilized to facilitate a successful delivery of the message. Alternatively, in response to a failed first delivery attempt, SG 300 may query the appropriate network location register (e.g., HLR, HSS) to obtain more current subscriber location information, and this location information may be used to a successful delivery of the message.

Failure of SMS delivery may be detected by SG 300 if SG 300 receives a negative ACK in response to the forward short message message sent to the MSC believed to be serving the recipient. If that MSC fails to locate the recipient, a failure notice may be returned to SG 300. If SG 300 detects that the first attempt failed, SG 300 may re-send the SMS message to the appropriate MT-SMSC. In one implementation, SG 300 may temporarily store the SMS message until either a positive ACK from the MSC indicating that the SMS message was delivered or a failure response. If a positive ACK is received, the stored SMS message may be discarded or over-written. If a negative response is received, the SMS message may be sent to the MT-SMSC for store and forward treatment.

3G Messaging Service

As described above, the basic principles of the subject matter disclosed herein may be applied to communication networks that employ signaling and messaging service protocols other than SS7 MAP. For example, in 3G IP Multimedia Subsystem (IMS) networks, SIP, DIAMETER, RADIUS and other protocols may be used to manage subscriber mobility/location information and provide messaging service transport.

For example, an MSSC function of the subject matter disclosed herein may be adapted to intercept DIAMETER messages carrying IMS subscriber location information, and the location information may be cached for later use in delivering IMS-based messaging service messages (e.g., SIP messages). Exemplary DIAMETER mobility management messages may include ServerAssignmentRequest/ServerAssignmentAnswer messages, LocationInfoRequest/LocationInfoAnswer messages, RegistrationTerminationRequest/RegistrationTerminationAnswer messages, and PushProfileRequest/PushProfileAnswer messages. These and other similar types of messages that contain subscriber location and/or profile information may be intercepted and processed in a manner similar to that described above with respect to GSM MAP UpdateLocation, CancelLocation, InsertSubscriberData mobility management messages.

Messages employed in an IMS network to transport messaging service payloads may also be intercepted and processed in a manner similar to that described in detail above with respect to a GSM MAP ForwardShortMessage. For example, a SIP message, such as a SIP MESSAGE message, a SIP INFO message, a SIP INVITE message, or other SIP message types may be employed in an IMS network to transport a message service payload (e.g., a short text message, an instant message dialog, a multimedia message, a video message, an audio message, etc.). In this manner, 3G IMS HSS entities and messaging server entities may benefit from the same traffic shielding described previously with respect to a 2G GSM network implementation.

2G/3G Messaging Service Interworking

It will be further appreciated that an SG routing node that includes an MSSC function according to one embodiment of the subject matter disclosed herein may be adapted to simultaneously provide first-delivery-attempt messaging service to both a 2G network (e.g., a GSM network) and a 3G IMS network (e.g., IMS network). As such, an SG of the subject matter disclosed herein may cache mobile subscriber location information that is intercepted/obtained from both the 2G and 3G networks. By maintaining both 2G and 3G location information associated with a mobile subscriber in the cache, the SG is adapted to receive messaging service messages and dynamically determine whether a received messaging service message should be delivered to the subscriber via 2G messaging service, 3G messaging service, or both.

In one embodiment, a global default delivery preference may be established for all subscribers that are being serviced by an MSSC function. For example, if a subscriber is simultaneously available to receive messaging service messages in both a 2G (e.g., GSM) network and a 3G (e.g., IMS) network, that is, location information is available for the subscriber in both networks, then a received messaging service message is always delivered to the subscriber via the 3G network.

Alternatively, subscriber specific delivery preferences or defaults may be used to make 2G/3G delivery decisions. In this embodiment, subscriber specific delivery preferences may be dynamically extracted from intercepted mobility management/subscriber profile messages, or this information may be provisioned in the MSSC function by a network operator. In either case, subscriber delivery preference/default information may be stored in a location information cache that is similar to cache 354 or in another database that is accessible by an MSSC function.

Figure 11:
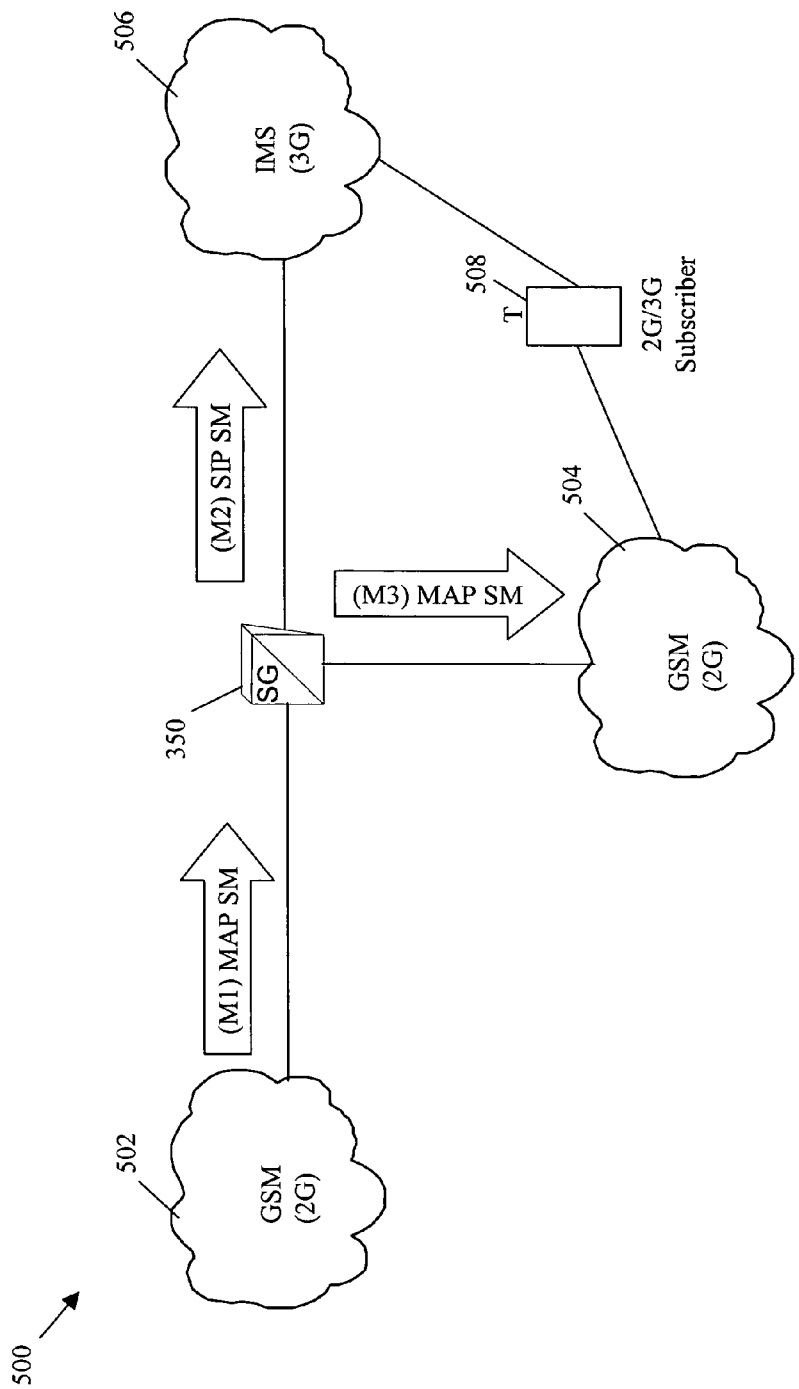
FIG. 11 is a network diagram that illustrates an embodiment of the subject matter disclosed herein, which includes 2G/3G messaging service interworking functionality.

It will be appreciated that an MSSC function that is adapted to provide the 2G/3G interworking service described above may also be required to translate a received messaging service message from a 2G format to a 3G format, and vice versa. For instance, in the exemplary messaging scenario presented in FIG. 11, a 2G/3G networking environment 500 includes a first 2G GSM network 502, a second 2G GSM network 504, a 3G IMS network 506, and an SG node 350. In FIG. 11, a subscriber 508 is assumed to be capable of receiving messages from a 2G or 3G network. SG node 350 includes an MSSC function with the 2G/3G interworking capability described above. SG node 350 is adapted to intercept and cache 2G and 3G subscriber location/profile information. In the exemplary messaging scenario illustrated in FIG. 11, SG node 350 is further adapted to receive a 2G messaging service message (M1), such as a GSM MAP ForwardShortMessage message.

A 2G/3G interworking MSSC function associated with SG 350 generates a 3G messaging service message (e.g., a SIP MESSAGE message) that includes some of, all of, or a media-translated version of the 2G message payload. For example, 2G/3G interworking MSSC function may examine the 2G messaging service message and determine that the message contains a short alphanumeric text message. The MSSC function may examine message delivery preferences associated with the intended message recipient and determine that the message recipient would prefer to receive such 2G text messages in a 3G-capable audio format. As such, the MSSC function is adapted to invoke a text-to-speech processing algorithm, which performs the conversion from text to speech. Any suitable text-to-speech converter, such as speech SDK or Speech Server, both available from Microsoft Corporation, can be used. The resulting audio-speech file is encapsulated within a 3G messaging service message (M2), such as a SIP MESSAGE message, and the 3G message is delivered to the 3G subscriber using the 3G subscriber location information obtained from the MSSC subscriber location cache. The 2G message (M3) may also be delivered to the subscriber in 2G format, using 2G subscriber location information obtained from the MSSC subscriber location cache.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for messaging service message delivery, the method comprising:
    (a) at a subscriber location database separate from a network location register, caching mobile subscriber location information based on messages sent to or from the location register; and
    (b) at a messaging service subscriber caching (MSSC) function:
        (i) receiving a messaging service message;
        (ii) querying the subscriber location database;
        (iii) obtaining mobile subscriber location information from the cached mobile subscriber location information; and
        (iv) attempting to deliver the messaging service message based on the mobile subscriber location information obtained from the cached mobile subscriber location information.

2. The method of claim 1 wherein the network location register comprises a home location register (HLR).

3. The method of claim 1 wherein the network location register comprises a home subscriber server (HSS).

4. The method of claim 1 wherein the MSSC function is located at a network routing node.

5. The method of claim 1 comprising, in response to failing to deliver the messaging service message, querying the network location register for mobile subscriber location and availability information.

6. A method for messaging service message delivery, the method comprising:
    (a) at a subscriber location database separate from a network location register, caching mobile subscriber location information based on messages sent to or from the location register; and
    (b) at a messaging service subscriber caching (MSSC) function:
        (i) receiving a messaging service message;
        (ii) querying the subscriber location database;
        (iii) obtaining mobile subscriber location information;
        (iv) attempting to deliver the messaging service message based on the mobile subscriber location information;
        (v) in response to failing to deliver the messaging service message, querying the network location register for mobile subscriber location and availability information; and
        (vi) in response to receiving information indicating unavailability of the mobile subscriber, forwarding the messaging service message to a store and forward message processing system.

7. The method of claim 1 wherein attempting to deliver the messaging service message includes sending the messaging service message to a mobile switching center (MSC) believed to be serving a destination mobile subscriber.

8. A method for messaging service message delivery, the method comprising:

(a) at a subscriber location database separate from a network location register, caching mobile subscriber location information based on messages sent to or from the location register; and (b) at a messaging service subscriber caching (MSSC) function:
  (i) receiving a messaging service message;
  (ii) querying in the subscriber location database;
  (iii) obtaining mobile subscriber location information; and
  (iv) attempting to deliver the messaging service message based on the mobile subscriber location information, wherein attempting to deliver the messaging service message includes sending the messaging service message to a mobile switching center (MSC) believed to be serving a destination mobile subscriber;
  (v) caching the messaging service message;
  (vi) receiving a response from the MSC indicating failure of delivery of the messaging service message; and
  (vii) in response to receiving the notification, forwarding the messaging service message to a mobile terminating short message service center (MT-SMSC).

9. A method for providing subscriber location information associated with the delivery of messaging service messages, the method comprising:

(a) at a subscriber location database separate from a network location register, caching mobile subscriber location information based on messages sent to or from the location register;

(b) at a messaging service center:
  (i) receiving a messaging service message addressed to a message recipient;
  (ii) formulating a network location register query, requesting location information associated with the message recipient; and
  (iii) transmitting the query; and (c) at a messaging service subscriber caching (MSSC) function:
  (i) intercepting the query;
  (ii) extracting the message recipient location information from the subscriber location database; and
  (iii) providing the message recipient location information to the messaging service center.

10. The method of claim 9 wherein the network location register comprises a home location register (HLR).

11. The method of claim 9 wherein the network location register comprises a home subscriber server (HSS).

12. The method of claim 9 where the messaging service center comprises a short message service center (SMSC).

13. The method of claim 9 where a message service center comprises a session initiation protocol (SIP) message server.

14. The method of claim 9 wherein the MSSC function is located at a network routing node.

15. A method for delivering a messaging service message to a messaging service subscriber capable of receiving the message via a plurality of networks:

(a) at a subscriber location database separate from a network location register, caching mobile subscriber location information associated with a plurality of networks based on messages sent to or from location registers in the networks; and (b) at an interworking messaging service subscriber caching (MSSC) function:
  (i) receiving a messaging service message;
  (ii) querying the subscriber location database;
  (iii) obtaining mobile subscriber location information associated with at least one of the networks;
  (iv) selecting at least one of the networks; and
  (v) attempting to deliver the message to the at least one selected network using the mobile subscriber location information.

16. The method of claim 15 wherein a network location register comprises a home location register (HLR).

17. The method of claim 15 wherein a network location register comprises a home subscriber server (HSS).

18. The method of claim 15 wherein the interworking MSSC function is located at a network routing node.

19. The method of claim 15 including translating the received messaging service message to a signaling format compatible with each network to which delivery is required.

20. The method of claim 15 including converting a message content payload of the received messaging service message to a different media type.

21. The method of claim 20 wherein converting the message content payload comprises converting a text payload to an audio-speech payload.

22. The method of claim 15 wherein selecting at least one of the networks includes examining subscriber delivery preference information.

23. A system for messaging service message delivery, the system comprising:

(a) a subscriber location database separate from a network location register for obtaining and caching mobile subscriber location information based on messages sent to or from the network location register; and (b) a messaging service subscriber caching (MSSC) function for receiving a message service message, for obtaining mobile subscriber location information from the cached mobile subscriber location information stored in the subscriber location database and for attempting to deliver the messaging service message based on the mobile subscriber location information obtained from the cached mobile subscriber location information stored in the subscriber location database.

24. The system of claim 23 wherein the network location register comprises a home location register (HLR).

25. The system of claim 23 wherein the network location register comprises a home subscriber server (HSS).

26. The system of claim 23 wherein the subscriber location database is co-located with a network routing node.

27. The system of claim 23 wherein the MSSC function is co-located with a network routing node.

28. The system of claim 23 wherein, in response to failing to deliver the messaging service message, the MSSC function is adapted to query a network location register for the mobile subscriber location and availability information.

29. A system for messaging service message delivery, the system comprising:

(a) a subscriber location database separate from a network location register for obtaining and storing mobile subscriber location information based on messages sent to or from the network location register; and (b) a messaging service subscriber caching (MSSC) function for receiving a message service message, for obtaining mobile subscriber location information from the subscriber location database and for attempting to deliver the messaging service message based on the mobile subscriber location information received from the subscriber location database, and in response to failing to deliver the messaging service message, the MSSC function is adapted to query a network location register for the mobile subscriber location and availability information, and in response to failing to receive information indicating availability of the subscriber, the MSSC function is adapted to forward the messaging service message to a store and forward message processing system.

30. A system for providing subscriber location information associated with the delivery of messaging service messages, the system comprising:
   (a) a subscriber location database separate from a network location register for obtaining and caching mobile subscriber location information based on messages sent to or from the network location register; and
   (b) a messaging service subscriber caching (MSSC) function for:
      (i) receiving a request for subscriber location information associated with the delivery of a message service message, where the request is destined for a network location register;
      (ii) obtaining the requested mobile subscriber location information from the cached mobile subscriber location information stored in the subscriber location database; and
      (iii) responding to the received request with the requested subscriber location information on behalf of the network location register.

31. The system of claim 30 wherein the network location register is a home location register (HLR).

32. The system of claim 30 wherein the network location register is a home subscriber server (HSS).

33. The system of claim 30 wherein the subscriber location database is co-located with a network routing node.

34. The system of claim 30 wherein the MSSC function is co-located with a network routing node.

35. A computer program product comprising computer-executable instructions embodied in a computer-readable medium for performing steps comprising:
   (a) at a subscriber location database separate from a network location register, caching mobile subscriber location information based on messages sent to or from the location register; and
   (b) at a messaging service subscriber caching (MSSC) function:
      (i) receiving a messaging service message;
      (ii) querying the subscriber location database;
      (iii) obtaining mobile subscriber location information; and
      (iv) attempting to deliver the messaging service message based on the mobile subscriber location information.

36. A computer program product comprising computer-executable instructions embodied in a computer-readable medium for performing steps comprising:
   (a) at a subscriber location database separate from a network location register, caching mobile subscriber location information based on messages sent to or from the location register;
   (b) at a messaging service center:
      (i) receiving a messaging service message addressed to a message recipient;
      (ii) formulating a network location register query, requesting location information associated with the message recipient; and
      (iii) transmitting the query; and
   (c) at a messaging service subscriber caching (MSSC) function:
      (i) intercepting the query;
      (ii) extracting the message recipient location information from the subscriber location database; and
      (iii) providing the message recipient location information to the messaging service center.

37. A computer program product comprising computer-executable instructions embodied in a computer-readable medium for performing steps comprising:
   (a) at a subscriber location database separate from a network location register, caching mobile subscriber location information associated with a plurality of networks based on messages sent to or from location registers in the networks; and
   (b) at an interworking messaging service subscriber caching (MSSC) function:
      (i) receiving a messaging service message;
      (ii) querying the subscriber location database;
      (iii) obtaining mobile subscriber location information associated with at least one of the networks;
      (iv) selecting at least one of the networks; and
      (v) attempting to deliver the message to the at least one selected network using the mobile subscriber location information.

* * * * *